United States Patent
Galluch et al.

(10) Patent No.: US 9,282,749 B2
(45) Date of Patent: Mar. 15, 2016

(54) DOUGH PACKAGING AND METHOD FOR DOUGH PROCESSING

(71) Applicant: Rich Products Corporation, Buffalo, NY (US)

(72) Inventors: Noel Galluch, Boston, NY (US); Kristin Alongi, Hamburg, NY (US); Renee LaLonde, Buffalo, NY (US); Rohit Jalali, Bentonville, AR (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 14/548,506

(22) Filed: Nov. 20, 2014

(65) Prior Publication Data
US 2015/0079228 A1    Mar. 19, 2015

Related U.S. Application Data

(62) Division of application No. 13/943,259, filed on Jul. 16, 2013.

(60) Provisional application No. 61/672,408, filed on Jul. 17, 2012, provisional application No. 61/827,300, filed on May 24, 2013.

(51) Int. Cl.
*A21D 8/06* (2006.01)
*B65D 81/34* (2006.01)
*A47J 37/01* (2006.01)
*A21D 8/02* (2006.01)
*A21B 3/13* (2006.01)
*A21D 6/00* (2006.01)
*A21D 10/02* (2006.01)
*B65D 75/30* (2006.01)
*B65D 75/32* (2006.01)
*A21D 8/04* (2006.01)

(52) U.S. Cl.
CPC ... *A21D 8/06* (2013.01); *A21B 3/13* (2013.01); *A21D 6/001* (2013.01); *A21D 8/02* (2013.01); *A21D 8/04* (2013.01); *A21D 10/025* (2013.01); *A47J 37/01* (2013.01); *B65D 75/30* (2013.01); *B65D 75/327* (2013.01); *B65D 81/343* (2013.01); *B65D 2205/00* (2013.01); *B65D 2205/02* (2013.01); *B65D 2581/3408* (2013.01)

(58) Field of Classification Search
CPC .......... A21B 3/13; A21B 3/132; A21B 3/133; A21B 3/134; A21B 3/138; A47J 9/007; B29C 33/44; B29C 33/00
USPC ......................................................... 426/394
See application file for complete search history.

(56) References Cited

U.S. PATENT DOCUMENTS

| | | | |
|---|---|---|---|
| 3,584,320 A | | 6/1971 | Shearer |
| 4,120,984 A | * | 10/1978 | Richardson et al. .......... 426/412 |
| 5,057,252 A | * | 10/1991 | Kagawa ................... C08L 23/06 264/230 |
| 5,547,694 A | * | 8/1996 | Perry et al. .................... 426/118 |

(Continued)

OTHER PUBLICATIONS

U.S. Search Authority, International Search Report and Written Opinion, dated Mar. 4, 2014, in related application No. PCT/US2013/050691.

*Primary Examiner* — Drew Becker
*Assistant Examiner* — Bryan Kim
(74) *Attorney, Agent, or Firm* — Fay Sharpe LLP

(57) ABSTRACT

The present invention provides a method for dough processing, a method for providing a container for a dough product, a container, and a product formed by a container.

27 Claims, 18 Drawing Sheets

(56) References Cited

U.S. PATENT DOCUMENTS

| | | | |
|---|---|---|---|
| 6,054,697 A | 4/2000 | Woodward et al. | |
| 6,242,024 B1 | 6/2001 | Perry et al. | |
| 6,627,239 B1 * | 9/2003 | Gavie et al. | 426/128 |
| 6,629,493 B1 | 10/2003 | Schaible et al. | |
| 2002/0090414 A1 * | 7/2002 | Johnson | 425/440 |
| 2005/0031814 A1 | 2/2005 | Dawes | |
| 2005/0175753 A1 * | 8/2005 | Smith | A47J 37/01 426/496 |
| 2005/0281923 A1 | 12/2005 | Kubat et al. | |
| 2006/0051540 A1 | 3/2006 | Kagawa | |
| 2009/0155419 A1 | 6/2009 | Gan et al. | |
| 2009/0181135 A1 | 7/2009 | Domingues et al. | |
| 2011/0027438 A1 | 2/2011 | Finkowski et al. | |
| 2011/0065556 A1 | 3/2011 | Middleton et al. | |
| 2011/0114532 A1 | 5/2011 | Francois et al. | |
| 2011/0151062 A1 | 6/2011 | Sharma | |

* cited by examiner

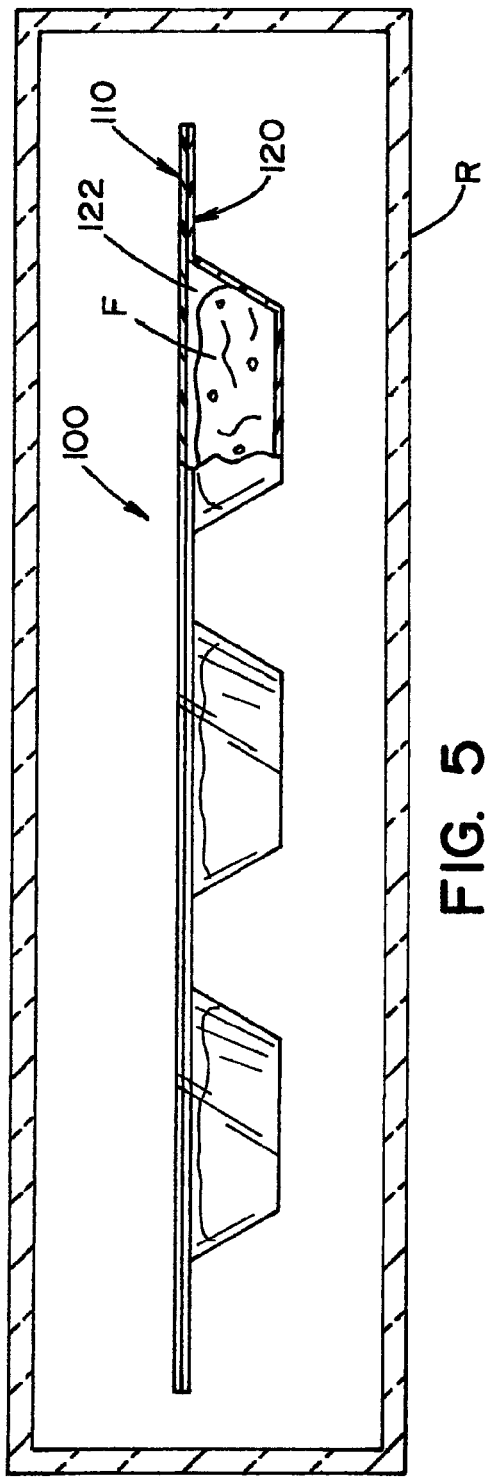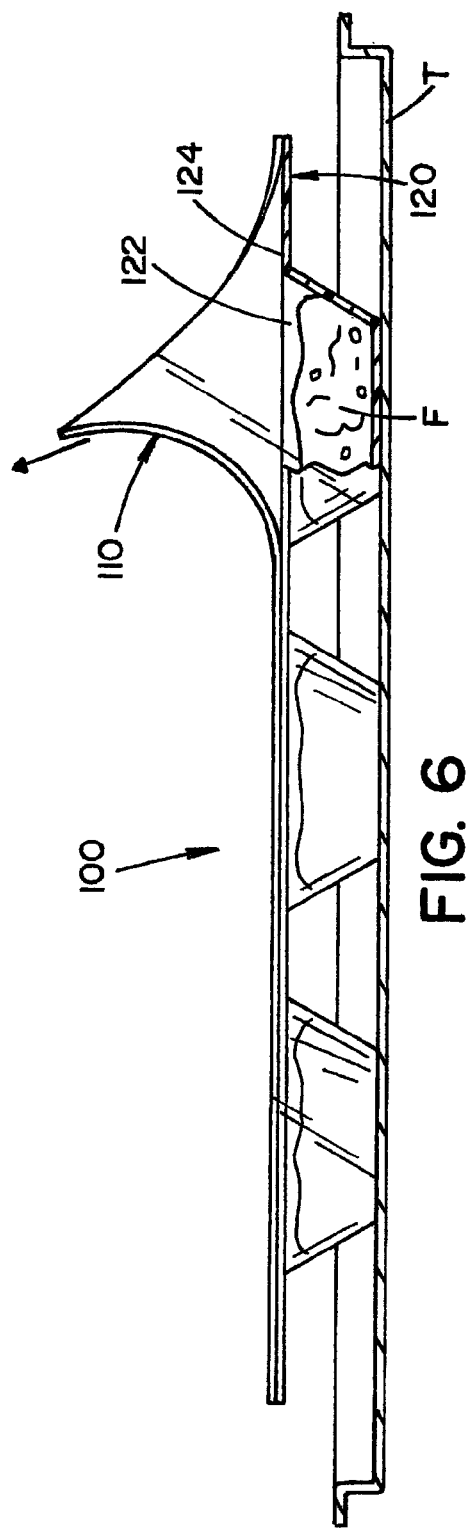

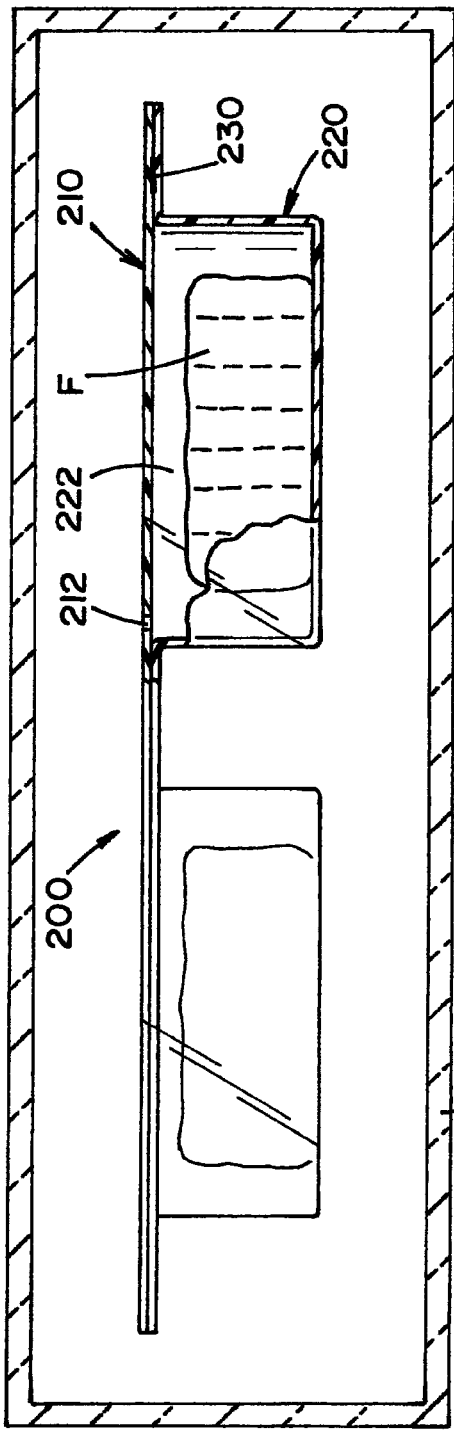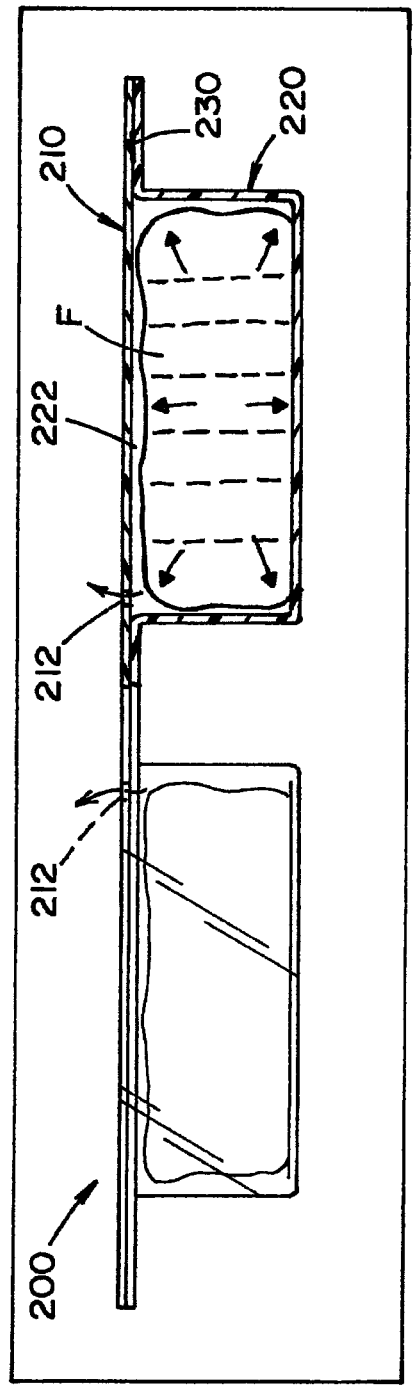

DOUGH PACKAGING AND METHOD FOR DOUGH PROCESSING

The present invention is a divisional of U.S. patent application Ser. No. 13/943,259 filed Jul. 16, 2013, which in turn claims priority on U.S. Provisional Application Ser. No. 61/672,408 filed Jul. 17, 2012 and 61/827,300 filed May 24, 2013, which are both incorporated herein by reference.

The present invention relates to bakery goods, particularly to dough products, more particularly to the packaging and processing of dough products, and even more particularly to the packaging, processing and cooking of dough products.

BACKGROUND OF THE INVENTION

Proof and bake products have long been the standard for quality. By nature of the proofing and baking process, a required skill level is needed in addition to special equipment designed to manage the proofing process. This makes it difficult for many food service and in-store bakery operations to execute proof and bake programs at store level (lack of skill, equipment or space). To address the challenge of proofing, many users have pursued retarder to oven (RTO) formulations which involve the use of a retarder and floor thawing. However, even these formulations need the end-user to have some understanding and knowledge of proofing conditions.

SUMMARY OF THE INVENTION

The present invention is directed to a packaging and method for use in 1) packaging and/or storing unproofed dough products, 2) proofing dough products, 3) storing proofed, partially proofed or unproofed dough products, and/or 4) cooking proofed dough products. As defined herein, "dough product" means any type of batter or dough. The dough product can include cereal grains, seeds and/or roots. For example, the dough products as defined in the present invention can be formed of one or more of the following ingredients: maize or corn, sorghum, fonio, millet, coixseed, wheat, rice, rye, barley, oat, triticale, teff, amaranth, quinoa, buckwheat, soybean, common bean, chickpea, lima bean, runner bean, pigeon pea, lentil, field pea, lupin, mung bean, fava bean, peanuts, poppy seeds, acorns, almonds, amaranth flour, cassava flour made from the root of the cassava, tapioca, chestnuts, potatoes, coconut, hemp, mesquite, and/or hazelnuts. As can be appreciated, the dough products can include other or additional ingredients.

In one non-limiting aspect of the present invention, there is provided a packaging that is formed of a material that can contain dough product without adversely reacting with the dough product. Non-limiting examples of materials include, but are not limited to, plastic materials. One non-limiting plastic material that can be used to fully or partially form the packaging is a polyester film such as, but not limited to a MYLAR® material offered by DuPont under the brand TEIJIN FILMS™ (e.g., MYLAR® 400BKFP, MYLAR® 200BKFP, MYLAR® 100BK5, MYLAR® 200BKP5, MYLAR® 100BK52, etc.). As can be appreciated other or additional MYLAR® products can be used and/or other types of plastic materials can be used. The thickness of the plastic material that is used to partially or fully form the packaging is non-limiting. The plastic material generally has a thickness of about 0.2-50 mils; however, other thicknesses can be used. In one non-limiting configuration, the plastic material has a thickness of about 0.2-20 mils. In another non-limiting configuration, the plastic material has a thickness of about 0.5-10 mils. In still another non-limiting configuration, the plastic material has a thickness of about 1-5 mils. The packaging can use a uniform material thickness, or have different material thicknesses for different regions of the packaging. For example, the base portion of the packaging can have a greater thickness than the top of the packaging; however, this is not required. Different types of plastic can be used to form different portions of the packaging; however, this is not required. For example, the base portion of the packaging can be formed of a different material than the material used to form the top portion of the packaging; however, this is not required. The plastic material can optionally be a transparent or semi-transparent material. Such a material, when used, can enable a user to view the dough product during the storage of the product in the packaging, the proofing of the product in the packaging, and/or the baking of the dough product in the packaging. When the packaging includes a base and top portion, the base and/or top portion can option be formed of the transparent or semi-transparent material.

In another and/or alternative non-limiting aspect of the present invention, the packaging can include a top portion that is partially or fully removable from the base portion of the packaging; however, this is not required. When the top portion is partially or fully removable, the top portion can be partially or fully removably secured to the base portion by an adhesive, melted seam, etc. The top portion and/or base portion can also or alternatively include serrations to facilitate in the removal of all or a portion of the top portion from the base portion.

In still another and/or alternative non-limiting aspect of the present invention, the packaging can be designed to controllably release gas ($CO_2$, water vapor, etc.) during the proofing and/or baking of the dough product; however, this is not required. The gas release from the packaging can be achieved in one or more arrangements. Non-limiting arrangements include 1) selecting gas-permeable materials for use in one or more portions of the packaging, 2) inserting one or more openings, slots serrations, etc. in the packaging, and/or 3) using an adhesive material that will release under certain pressures/temperatures. In one non-limiting specific example, one or more small openings can be intentionally formed in the top portion, the bottom portion and/or between the top and bottom portions. The size, number and location of the intentional openings are non-limiting. In another non-limiting specific example, the top portion of the packaging can be designed to be partially or fully disengaged from the base portion of the packaging during the proofing and/or baking of the product in the packaging. An adhesive, melted seam, mechanical connection (e.g., snap connection, hook and loop connection, etc.) can be used to secure the top portion to the bottom portion to fully or partially entrap one or more dough products between the base portion and the top portion. When an adhesive is used, the type of the adhesive, the pressure and/or temperature used to secure the top portion to the base portion via the adhesive, the thickness of the adhesive, the uniformity of the adhesive, the width of the adhesive layer, etc. can be used to control when the top portion partially or fully releases from the base portion during the proofing and/or baking of the dough product; however, this is not required. The amount of adhesive used to partially or fully connect the top portion to the bottom portion can be varied in composition, thickness, and/or width so that certain regions of the top portion release from the bottom portion at differing times and/or under differing conditions during the proofing and/or baking of the dough product; however, this is not required. As can be appreciated, the packaging can include one or more intentional openings and/or be designed to form one or more openings during the proofing and/or baking of the dough product; however, this is not required. The one or more intentional openings and/or formed openings can be designed to maintain in size and/or change in size (e.g., increase in size, decrease in size) during the proofing and/or baking of the dough product. The number of formed openings in the packaging can stay the same or change (e.g., increase in number, decrease in number) during the proofing and/or baking of the dough product. The use of one or more intentional openings, the formation of one or more openings, the number of one or more intentional openings and/or formed openings, the size of the one or more intentional openings and/or formed openings, and/or the control of formation of the one or more formed openings during the proofing and/or baking of the dough product can be used to control of gas release, if any, from the packaging during the proofing and/or baking of the dough product so as to control the moisture content, $CO_2$ content, etc. of the dough product during the proofing and/or cooking of the dough product. As can be appreciated, the packaging can be designed to not release any gas or substantially no gas during the proofing and/or cooking of the dough product. The one or more intentional openings and/or one or more formed openings in the packaging, when used, can be used to allow gases to more easily escape during the baking and/or proofing process; however, this is not required. These one or more intentional openings and/or one or more formed openings in the packaging, when used, can also or alternatively be used to control the moisture content of the dough product during the baking and/or proofing process; however, this is not required. The one or more intentional openings and/or one or more formed openings in the packaging, when used, can also or alternatively be used to facilitate the uniform baking of the dough product during the baking process. For example, the packaging can include multiple cavities or wells that each include a dough product. The cavities or wells in the one or more regions of the packaging (e.g., central region of the packaging, etc.) may exhibit slower baking of the dough product than dough product located in other regions of the packaging. The one or more intentional openings and/or one or more formed openings in the packaging, when used, can be used to cause such slower baking regions to accelerate in baking. Such acceleration can be due in part to heat being allowed to enter the cavities via the one or more openings; however, this is not required. The one or more intentional openings in the packaging, when used, can be used to accelerate the rate at which adjacent adhesively connected regions of the top portion release from the bottom portion during the baking and/or proofing process; however, this is not required. The size and/or number of the openings can be selected to control the rate at which gas is released during the baking and/or proofing process; however, this is not required. The one or more openings can also or alternatively be used to control the heating of the product during a baking process; however, this is not required. The one or more openings, when used, not only can allow gas to escape a product cavity, but also allow heat to enter the cavity so as to facilitate in the drying and/or baking of the product in the cavity; however, this is not required. As such, strategic control of openings and/or the formation of openings can thus be used to control the uniform proofing and/or baking of a product; however, this is not required.

In yet another and/or alternative non-limiting aspect of the present invention, one or more portions of the packaging can be formed of a material that shrinks, expands, changes to a new shape, reverts partially or fully back to an original shape, etc. during the freezing, proofing and/or baking of the dough product. In one non-limiting example, one or more portions of the packaging can be designed to expand during the proofing and/or baking of the dough product; however, this is not required. For instance, during the proofing of a dough product, $CO_2$ and/or water vapor is formed, resulting in an increased pressure. Likewise, when a dough product is baked, water vapor is produced. The packaging can be designed to expand after a certain threshold pressure is obtained due to the formation of $CO_2$ and/or water vapor; however, this is not required. The expansion of the packaging can allow the dough to expand and rise to form a desired shape and/or size during the proofing and/or baking of the dough product; however, this is not required. When the packaging is expandable, all of the packaging can be designed to be expandable or only a portion of the packaging can be designed to be expandable. In one non-limiting specific example, the base portion of the packaging can be designed to be non-expandable, and the top portion of the packaging can be designed to be expandable; however, this is not required. In another and/or alternative non-limiting specific example, the base portion of the packaging can be designed to be expandable, and the top portion of the packaging can be designed to be non-expandable; however, this is not required. In still another and/or alternative non-limiting specific example, the top and bottom portions of the packaging can be designed to be expandable, but the top and bottom portions are designed to expand at a different amount and/or rate; however, this is not required. In another and/or alternative example, one or more portions of the packaging can be designed to partially revert back to its original shape during the heating of the packaging while proofing and/or baking the dough product; however, this is not required. In one non-limiting specific example, the base portion of the packaging can be molded or otherwise formed into a specific shape and be designed, during the baking of the dough product, to partially or fully lose its molded shape; however, this is not required. In another non-limiting specific example, the top portion of the packaging can be molded or otherwise formed into a specific shape and be designed, during the baking of the dough product, to partially or fully lose its molded shape; however, this is not required. When the packaging includes both a base and a top portion, and when the base and/or top portion are molded into a shape, and when the base and/or top portion are designed, during the baking of the dough product, to partially or fully lose its molded shape, the top portion can be designed to partially or fully release from the bottom portion prior to and/or during the base and/or top portion partially or fully losing its molded shape; however, this is not required. In another non-limiting configuration, a plastic material can be used to partially or fully form the packaging. The top portion and/or base portion of the packaging can be heat formed or molded in a press, etc. to form a bottom and/or top cavity for a dough product. For instance, a flat sheet of plastic material can be heated and/or pressed by a cavity mold to form a top portion and/or a base portion that has a cavity that was formed by the cavity mold. The packaging can be designed to include one or more cavities that are designed to receive a dough product. Each cavity is generally designed to hold an individual dough product (e.g., cinnamon roll, muffin, roll, etc.). The plastic material can be selected and formed to maintain some memory in the plastic to thereby cause the cavity to 1) maintain its shape during the baking of the dough product, or 2) partially or fully revert back to its original shape (e.g., flat sheet state) that existed prior to the molding or forming process during the baking process of the dough product. Such memory feature of the plastic can be used to 1) partially flatten tops of a muffin or other type of dough products during the baking of the dough product, 2) compress the sides and/or top of the dough product during the baking of the dough product, and/or 3)

maintain the base and/or top portion of a product at the beginning of a baking process and then partially or fully flatten out for the remainder of the baking process to form special types of bakery goods (e.g., muffin tops, etc.). This memory feature of the plastic material can be advantageously used for different types of bakery goods (e.g., cookies, brownies, cinnamon rolls, cinnamon twists or sticks, muffins, pizza dough, bread loaf, rolls, cake, pastry, muffin tops, etc.). The degree to which the plastic material shrinks and/or partially reverts back to its original shape can be at least partially controlled by the type of material, thickness of material, the parameters (e.g., temperature, pressure, time, etc.) in which the material is formed into certain shapes, and/or the heating temperature of the material during the baking of the dough product. Although it has been described above that the plastic material can be designed to partially or fully revert back to its original shape during the baking process, it can be appreciated that the plastic material can be designed to partially or fully revert back to its original shape during the proofing process; however, this is not required.

In still yet another and/or alternative aspect of the present invention, there is provided a method for processing a dough product which comprises the steps of:

1. Loading a dough product in a container or packaging;
2. Proofing the dough product in the container or packaging;
3. Removing the proofed dough product from the container or packaging.

A. One optional additional step includes the fact that the container or packaging is a bakable container or packaging, and optionally baking the dough product in the bakable container or packaging after the bakery product has been partially or fully proofed.
  B. Another and/or alternative additional step includes sealing the dough product in the container or packaging after the dough product is loaded in the container or packaging.
  C. Still another and/or alternative additional step includes freezing the dough product in the container or packaging after the dough product is loaded in the container or packaging.
  D. Yet another and/or alternative additional step includes freezing the dough product in the container or packaging after the dough product is loaded in the container or packaging, and then subsequently 1) thawing the dough product in the packaging, 2) thawing and baking the dough product in the packaging, 3) thawing and proofing the dough product in the packaging, or 4) thawing, proofing and baking the dough product in the packaging.
  E. Another and/or alternative additional step is to at least partially form the container or packaging from a sheet of plastic material. Such forming process can include the passing of the sheet of plastic material through a press that forms one or more cavities in the plastic sheet by the use of heat and/or pressure while subjecting the plastic material to one or more cavity molds.
  F. Still another and/or alternative additional step is to at least partially form a container or packaging that has a base portion and a top portion. The base portion and/or top portion can include one or more cavities for containing one or more dough products. The base portion and/or top portion can be formed of a plastic material which can be formed of the same or different material and/or have the same or different thickness. The top portion can be connected to the base portion in a variety of arrangements (e.g., melted bond, adhesive, snap fit, compression fit, etc.).
  G. Yet another and/or alternative additional step is to at least partially form a container or packaging that has a base portion and a top portion and the top portion is designed to release from one or more portions of the base portion during the proofing and/or baking of the dough product so as to release gas and/or water vapor from one or more of the cavities of the container or packaging (i.e., self-vent) to 1) at least partially control the pressure in the cavity or well of the dough product during the proofing and/or baking of the dough product, 2) at least partially control the moisture content of the dough product during the proofing and/or baking of the dough product, 3) at least partially control the $CO_2$ and/or carbonic acid content of the dough product during the proofing and/or baking of the dough product, 4) at least partially control the heating, baking time, and/or moisture content of the dough product, and/or 5) at least partially control the shape of the dough product during the proofing and/or baking of the dough product.
  H. Still yet another and/or alternative additional step is to at least partially form a container or packaging from a material that is stretchable, shrinkable and/or can at least revert to its original shape when subjected to heat, pressure, humidity, and certain types of electromagnetic radiation. The degree to which the material stretches, shrinks and/or at least partially reverts to its original shape during the freezing, proofing and/or baking of the dough product in the container or packaging can be at least partially controlled by the selection of the material, thickness of material, freezing temperature, freezing pressure, proofing temperature, proofing pressure, proofing humidity, baking temperature, baking pressure, baking humidity, the parameters (e.g., temperature, pressure, time, etc.) in which the material is formed into certain shapes, etc. The use of a container or packaging from a material that is stretchable, shrinkable and/or can at least revert to its original shape can be used to facilitate in forming the desired shape of the dough product (e.g., control flatness, control shape, etc.) during the proofing and/or baking of the dough product.
  I. Another and/or alternative additional step is to at least partially form a container or packaging that has a base portion and a top portion and the top portion is fully or at least partially retained on the base portion during the proofing and/or baking of the dough product.
  J. Still another and/or alternative additional step is to at least partially form a container or packaging that has a base portion and a top portion and the top portion is fully or at least partially removed from the base portion during the proofing and/or baking of the dough product.
  K. Yet another and/or alternative additional step is to control the pressure of the cavity or well of the container or packaging that includes the dough product. The cavity can be under a vacuum, pressurized, etc.

In still yet another and/or alternative non-limiting aspect of the present invention, there is provided a container or packaging that 1) increases food safety, 2) reduces food contamination, 3) results in faster proofing times for the dough product, 3) results in faster baking times for the dough product, 4) results in more uniform baking of the dough product, 5) reduces the handling of the dough product from humans during the packaging, proofing and/or baking process for the dough product, 6) simplifies the proofing of the dough product, 7) simplifies the baking of the dough product, 8) simplifies the packaging of the dough product, 9) simplifies the storage of the dough product, 10) simplifies the shipping of the dough product, 11) at least partially shapes the dough product during proofing, 12) at least partially shapes the dough product during baking, 13) changes its shape during the proofing and/or baking process, 14) at least partially controls the moisture content of the bakery product during the proofing and/or baking process, 15) at least partially controls the gas pressure of the bakery product in the cavity or well during the proofing and/or baking process, and/or 16) at least partially controls the gas content of the one or more gasses in the cavity or well during the proofing and/or baking process.

In another and/or alternative non-limiting aspect of the present invention, there is provided a method for dough processing which includes packaging unproofed dough in a container or packaging. The container or packaging can be a flexible, a gas impermeable, and/or a moisture proof container; however, this is not required. The container or packaging can be designed to create an airtight seal for the dough product in the container or packaging; however, this is not required. The container or packaging can be designed to enable freezing of the dough product in the container or packaging without any proofing; however, this is not required. In one non-limiting design, the container or packaging material can be expandable; however, this is not required. In another and/or alternative non-limiting design, the container or packaging can be designed to enable the container or packaging to be removed from the freezer so that the dough product in the container can be proofed while still in the container or packaging; however, this is not required. Once the dough product is proofed, the dough product can be partially or completely removed from the container or packaging and/or unsealed in the container or packaging and baked; however, this is not required. The baking of the product can be in the container or packaging, or the product can be removed from the container or packaging and placed in another container or packaging for baking. As can be appreciated, the dough product can remain sealed in the container or packaging during the proofing and/or baking of the dough product. The container or packaging can be designed to allow frozen dough that is sealed or partially sealed in the container or packaging to be proofed and then placed in an oven while still in the container or packaging. The container or packaging can be designed to be directly transferred from the freezer to the oven while the dough product is partially or fully sealed in the container or packaging. The container or packaging can be designed to allow frozen dough or non-frozen dough that is sealed or partially sealed in the container or packaging to be partially or fully proofed and then placed into a freezer. The proofed or partially proofed dough can then be taken out of the freezer, thawed and then baked in the container or packaging or removed from the container or packaging and placed in another container or packaging for baking. This process is an improvement over traditional yeast-based proofing processes. The present process requires no special baking skill, retarders or proof boxes to achieve a quality product. The packaging process is such that the extent of proofing is controlled and the use of a retarder or a proof box to produce high quality proof and bake products can be fully or partially eliminated.

In still another and/or alternative non-limiting aspect of the present invention, there is provided a process wherein the dough product can be packaged and frozen without any proofing prior to freezing, either before or after packaging. After removal from the freezer, proofing can be carried out in the packaging. The product can be optionally frozen in the packaging after being partially or proofed. The packaging material can be partially or fully moisture proof and/or gas impermeable so that, during the process of proofing, there is minimal or no loss of moisture from the packaging (and therefore from the dough) and/or the $CO_2$ and/or other volatile materials generated during proofing is/are restricted from escaping; however, this is not required. In such packaging, the $CO_2$, water vapor and other volatile materials help to build pressure within the packaging so that at least part of the proofing process occurs under pressure resulting from the buildup of gas and/or volatile materials.

In yet another and/or alternative non-limiting aspect of the present invention, there is provided a process of proofing a dough product by removing the packaged dough product from the freezer and then allowing the dough product to proof while it is still in the package. When the dough product is contained in a gas impermeable, moisture proof packaging, there is no need for a proof box or retarder having high humidity. Rather, all or a substantial amount of the moisture from the dough is not released outside of the packaging, thus eliminating the need for having a specific humidity in the proofing enclosure. Additionally, because little or no moisture is released, the packaged dough product can be left for proofing for a much longer time (e.g., double the standard proofing time) without the concern for drying of the dough product. For example, after the dough product is removed from the freezer, the present dough can be placed in a retarder for several days (e.g., 1-10 days) without affecting the quality of the dough product or the baked dough product. In contrast, if the same dough product was proofed in a retarder without the packaging, the dough product becomes undesirable or unusable within about 48 hours. Also, the dough product, when partially or fully sealed in the packaging, can be proofed at room temperature for up to about 4-10 hours without any undesirable effect on the performance of the dough product. However, if the same dough product is allowed to proof in an uncovered package or container or otherwise left exposed on a counter top, the dough product cannot be left at room temperature for more than 3-4 hours without adversely affecting performance of the dough product. Adverse performance seen without partial or full sealing the dough product in the packaging includes dryness in the dough product and/or surface crusting.

In still yet another and/or alternative non-limiting aspect of the present invention, there is provided a process wherein the packaging allows the dough to be proofed in the packaging while the dough product is still contained in the packaging. Once proofing of the dough product is complete, the dough product can be 1) frozen for later use, 2) partially or completely uncovered in the packaging during the baking of the dough product, or 3) partially or fully sealed during the complete or partial baking of the dough product. The term "sealed" or "fully sealed" means that the product in the packaging is encapsulated in an environment that prevents at least about 95%, and typically 100%, of the moisture and/or gas from escaping the environment. The term "partially sealed" means that the product in the packaging is encapsulated in an environment that can include one or more small openings that control the release of the moisture and/or gas from the encapsulated environment during the proofing and/or baking of the product. Generally, the one or more small openings are formed after 1) a certain pressure within the encapsulated environment is obtained, 2) after a certain temperature within the encapsulated environment is obtained, and/or 3) after the packaging has been exposed to a certain temperature for a certain period of time. These small opening, when used, can prevent the encapsulated environment from becoming over pressurized which can adversely affect the proofing and/or baking of the product and/or damage the packaging. The term "uncovered" means that the product in the packaging is exposed to the ambient environment and achieves pressure equilibrium with the ambient environment in less than about 0.5-1 seconds. The one or more small openings that are used in a partially sealed product will also eventually allow the product in the packaging to reach pressure equilibrium with the ambient environment; however, the time period is greater than 1 second and more typically about 3 seconds to 5 minutes. For example, product can be uncovered by the top portion of the packaging being pulled back, cut or partially or fully released from the base portion of the packaging or container so as to expose the dough to the outside or ambient atmosphere (e.g., oven atmosphere, proofing atmosphere, outside atmosphere, etc.), but the dough can still remain in the packaging material. In such a situation, the uncovered product reaches pressure equilibrium with the outside or ambient atmosphere in less than one second. In one non-limiting arrangement, the size and number of the one or more small openings is selected such that during at least about 10% of the proofing period of the dough product in the partially or fully sealed package the pressure in the cavity that includes the dough product is greater than the ambient pressure of the package (e.g., 700-800 mm Hg). In another non-limiting arrangement, the size and number of the one or more small openings is selected such that, during 10% to 100% of the proofing period of the dough product in the partially or fully sealed package, the pressure in the cavity that includes the dough product is greater than the ambient pressure of the package. In still another non-limiting arrangement, the size and number of the one or more small openings is selected such that, during at least about 20% of the proofing period of the dough product in the partially or fully sealed package, the pressure in the cavity that includes the dough product is greater than the ambient pressure of the package. In yet another non-limiting arrangement, the size and number of the one or more small openings is selected such that, during at least about 40% of the proofing period of the dough product in the partially or fully sealed package, the pressure in the cavity that includes the dough product is greater than the ambient pressure of the package. In still another non-limiting arrangement, the size and number of the one or more small openings is selected such that, during more than 50% of the proofing period of the dough product in the partially or fully sealed package, the pressure in the cavity that includes the dough product is greater than the ambient pressure of the package. In still yet another non-limiting arrangement, the size and number of the one or more small openings is selected such that, during at least about 60% of the proofing period of the dough product in the partially or fully sealed package, the pressure in the cavity that includes the dough product is greater than the ambient pressure of the package. In another non-limiting arrangement, the size and number of the one or more small openings is selected such that, during at least about 75% of the proofing period of the dough product in the partially or fully sealed package, the pressure in the cavity that includes the dough product is greater than the ambient pressure of the package. In still another non-limiting arrangement, the size and number of the one or more small openings is selected such that, during up to 95% of the proofing period of the dough product in the partially or fully sealed package, the pressure in the cavity that includes the dough product is greater than the ambient pressure of the package. In yet another non-limiting arrangement, the size and number of the one or more small openings is selected such that, during up to 90% of the proofing period of the dough product in the partially or fully sealed package, the pressure in the cavity that includes the dough product is greater than the ambient pressure of the package. In still yet another non-limiting arrangement, the size and number of the one or more small openings is selected such that, during up to 80% of the proofing period of the dough product in the partially or fully sealed package, the pressure in the cavity that includes the dough product is greater than the ambient pressure of the package. In another non-limiting arrangement, the cross-section area of one, or a plurality, or a majority, or all of the openings is generally no more than about 0.8 in.$^2$, typically no more than about 0.6 in.$^2$, more typically no more than about 0.5 in.$^2$, still more typically no more than about 0.4 in.$^2$, yet still more typically no more than about 0.2 in.$^2$, still more typically no more than about 0.1 in.$^2$, yet more typically no more than about 0.05 in.$^2$, and still yet more typically no more than about 0.01 in.$^2$. When two or more openings are included in the packaging, the size and/or shape of the openings can be the same or different. In another non-limiting arrangement, one, or a plurality, or a majority, or all of the openings can be preformed openings, and/or can be formed 1) when a predefined pressure is achieved in the cavity that includes the dough product, and/or 2) when the packaging is exposed to a certain temperature for a certain period. When one or more of the openings are formed based partially or fully on the temperature exposure to the packaging, an adhesive that softens at a temperature above about 60-15° F. and typically above about 75-140° F., and more typically above about 80-120° F. is used; however, this is not required. The composition of the adhesive is non-limiting. When one or more of the openings are formed based partially or fully on the pressure achieved in the cavity that includes the dough product, the predefined pressure is generally at least about 2 mm Hg above ambient pressure, typically at least about 5 mm Hg above ambient pressure, more typically at least about 10 mm Hg above ambient pressure, and still more typically at least about 20 mm Hg. Also, when one or more of the openings are formed based partially or fully on the pressure achieved in the cavity or cell that includes the dough product, the predefined pressure is generally less than about 2000 mm Hg, typically less than about 1500 mm Hg, and more typically less than about 760 mm Hg; however, this is not required.

The proofing of the dough product can be carried out at a variety of temperatures (e.g., 33° F.-140° F., retarder temperature, room temperature, or proof box temperature, etc.) that will enable the yeast to produce $CO_2$. However, when the packaging is formed of a moisture-proof material, there is no need to adjust the humidity of the proofing containment during the proofing of the dough product. This feature of the packaging makes it much easier for the end-user to achieve proofing as the usual constraints of time, temperature and humidity are not present or are minimized compared to traditional proofing processes. The proofing can be carried out from a few minutes to several days (e.g., up to 10 days, etc.).

While not intending to be bound by any particular theory, it is believed that the superior quality product obtained when the product is partially or fully sealed in accordance with one aspect of the present invention is due to high hydration of the dough, improved carbonic acid break-down of the gluten cell structures due to the higher $CO_2$ content, and/or due to pressurized proofing. A high degree of hydration is achieved by having high water content and/or minimizing moisture loss during proofing. High water content has been a limiting factor in the traditional manufacturing processes because high water content dough products typically stick to the processing equipment. However, high water content dough product may be desirable in certain situations (such as for pizza dough, artisan bread, ciabatta bread, etc.). The present invention allows for the processing of high water content dough products using current manufacturing equipment by eliminating contact between the dough product and the processing equipment. The water content of the dough product that can be used in the packaging is non-limiting.

Additionally, because proofing of the dough product can be carried out in a fully or partially gas impermeable containment, the $CO_2$, water vapor, and/or volatile materials that are generated during proofing are restricted from escaping from the package. When proofing of the dough product begins, $CO_2$ is generated by the action of yeast in the dough forming gas cells. As the proofing progresses and more $CO_2$ is generated, the size of the gas cells in the dough product can increase. When the dough product is contained in airtight or sealed packaging, little or no gas is released from the packaging, resulting in an increase in pressure within the dough product. As the pressure increases in the packaging, the dough product is pushed against the cavity of the packaging, and due to an increase in pressure, some of the accumulated $CO_2$ will re-dissolve in the dough product. The packaging can be expandable to avoid buildup of excess pressure in the packaging and to maintain a pressure within a certain range. In another arrangement, the packaging can include one or more small openings (i.e., partially sealed packaging) and/or include regions that form one or more openings after a certain pressure threshold is reached to the pressure build-up in the packaging (i.e., a sealed package that is transformed into a partially sealed package after a certain pressure threshold is obtained) so that some accumulated $CO_2$ is released from the packaging to inhibit or prevent damage to the packaging, damage to the product, and/or undesired product shapes cause by the elevated pressure in the packaging. The size and/or number of the small openings, when used, can be selected to maintain the desired levels of accumulated $CO_2$ in the packaging during proofing and also inhibit or prevent damage to the packaging, damage to the product, and/or undesired product shapes cause by the elevated pressure in the packaging during proofing. It is believed that there are advantages to reducing the loss of $CO_2$ from the dough product. Because of accumulation of $CO_2$ in the packaging, and the redistribution of $CO_2$ in the dough product matrix, the pH of the dough is reduced. It is believed that the pH of the dough drops to below 5.5. Furthermore, the high amount of $CO_2$ in the dough is believed to act as an inhibitor of pathogens. Still further, the $CO_2$ that is forced back into the dough matrix is also believed to aid in producing an increased open texture in the baked products. The increased $CO_2$ content of the dough product is also believed to break down the gluten cell structures in the dough product due to the increased carbonic acid in the dough product. In addition, the reduced gas loss from the dough product will reduce or prevent the weight loss of the dough product by about 1-2% as is normally observed when the $CO_2$ is allowed to escape from the dough product. As discussed above, the advantages of proofing within the packaging include: 1) reduction of loss of $CO_2$; 2) reduction of loss of volatile materials (such as fermentation alcohols, water vapor, etc.); 3) no contamination of the dough by other food materials being processed or handled in the end-user facility; and/or 4) no contamination by the dough of other food materials being processed or handled in the end-user facility. This can be particularly desirable when preparing gluten-free dough products, or other special needs dough products and baked products. As described above, the packaging material can be gas impermeable, bakable, elastic, and/or flexible.

In still yet another and/or alternative non-limiting embodiment, the present invention provides a method for obtaining a baked product from a frozen dough comprising the steps of 1) obtaining an unproofed dough product; 2) packaging the unproofed dough product in a gas and/or moisture fully or partially impermeable, flexible and/or expandable packaging; 3) partially or fully sealing the packaging; 4) freezing the packaged dough product without proofing; 5) removing the frozen dough product from a freezer; 6) allowing the dough product to partially or fully proof while still in the partially or fully sealed packaging or in an unsealed packaging; 7) optionally refreezing the partially or fully proofed dough in the packaging; 8) optionally unsealing the dough product from the packaging; 9) optionally placing toppings on the partially or fully proofed dough while the dough is in a frozen, partially frozen or unfrozen state; and 10) baking the dough. As can be appreciated, the packaged dough can be partially or fully proofed before the initial freezing step.

In yet another and/or alternative non-limiting embodiment, after packaging the dough with or without proofing prior to freezing, the dough can be subjected to alternating high and low pressures, with the low pressure being lower than ambient pressure. It is believed such vacuum exercising strengthens the structure of the dough. Details of such exercising can be found in U.S. Publication No. 2007/0160709, which is incorporated herein by reference. For example, the dough can be subjected to mechanical stresses so as to restructure the dough matrix. Such restructuring may involve reducing the number of air cells and/or shifting the air cell size distribution toward larger air cells. The dough can be exercised by subjecting the dough to alternating high and low pressure such that the pressure differential between the high (a first pressure) and the low pressure (a second pressure) is between 1 to 20 inches of Hg; however, this is not required. One or more cycles of alternating pressure can be used wherein each half cycle last about 5 seconds to 10 minutes.

In still yet another and/or alternative non-limiting embodiment, the flour used for making the dough is heat-treated to increase the water absorption capacity of the flour. When dough is prepared from the heat treated flour, the dough holds more water than dough prepared from flour that was not heat treated. In one embodiment, the heat treatment is carried out according to the process described in U.S. Publication No. 2010/0092639, which is incorporated herein by reference. For example, the flour can be heat treated by a) thermally dehydrating the flour such that the moisture content of the flour is reduced to 1.5 to 4.1% and the flour is not gelatinized; and b) heating the dehydrated flour such that the moisture content of the flour does not go below 1.5% to obtain a heat-treated flour. The heat-treated flour can have at least 7% of the total proteins denatured. The heat-treated flour can have discernible starch granules. The heat-treated flour can have a particle size distribution such that greater than 80% of the flour particles are between 90 and 150 microns or greater than 80% of the flour particles are between 90 and 150 microns and greater than 7% of the flour particles are between 150 and 250 microns.

In another and/or alternative non-limiting embodiment, the dough used in the present invention can be any dough. For example, the dough comprises flour, water, yeast, one or more emulsifiers and one or more dough stabilizers as provided in U.S. Publication Nos. 2007/0160709 or 2010/0092639, which are incorporated herein by reference. The ingredients of the dough can be of any type that are known to be used for making dough.

In still another and/or alternative non-limiting embodiment, the thickness of the plastic film, the type of plastic film, and the parameters in which the plastic film is processed can be used to control the shape of the final bakery product. Non-limiting plastics that can be used include MYLAR® plastic films available from DuPont Teijin Films. For example, when the bottom portion of the packaging is to hold its shape during the baking step, generally a thicker sheet of plastic is used that is molded at a higher temperature and/or for longer heating times so as to reduce or remove the memory of the formed plastic sheet. In one non-limiting arrangement, the plastic sheet has a sheet thickness of at least 3 mils, and typically at least about 4 mils. During the forming of such sheet, the forming temperature is at least about 175° C., and typically at least about 200° C. The heating time of the plastic sheet during the molding process is generally at least 4 seconds and typically at least about 5 seconds. When a plastic sheet that forms the top portion is used, the plastic sheet is typically thinner than the sheet used to form the bottom portion; however, this is not required. In another non-limiting arrangement, when the molded plastic sheet is to lose all or most of its molded shape and revert back to its original shape during the heating process, the plastic sheet has a sheet thickness of no more than 3 mils, and typically about 1-2 mils. During the forming of such sheet, the forming temperature is no more than 195° C., and typically about 130-160° C. The heating time of the plastic sheet during the molding process is generally no more than about 4 seconds and typically about 1-3 seconds. After the plastic is heated, it is generally subjected to chilled water (e.g. 5-30° C.) to rapidly cool the molded plastic; however, this is not required. In one non-limiting arrangement, the base portion and/or top portion are formed from a flat sheet-like plastic material and are molded into a packaging that includes one or more cavities that are design to partially or fully receive a dough product. The molded plastic material is designed to retain its form during the baking of the dough product while the dough product is partially or fully contained in the one or more cavities of the packaging. In another non-limiting arrangement, the base portion and/or top portion are formed from a flat sheet-like plastic material and are molded into a packaging that includes one or more cavities that are design to partially or fully receive a dough product. The molded plastic material is designed to not retain its form during the baking of the dough product while the dough product is partially or fully contained in the one or more cavities of the packaging. In such an arrangement, at least about 50% of the molded form of the plastic material reverts back to its original flat sheet-like shape, typically at least about 75% of the molded form of the plastic material reverts back to its original flat sheet-like shape, and more typically at about at least 90% of the molded form of the plastic material reverts back to its original flat sheet-like shape.

In yet another and/or alternative non-limiting embodiment, there is provided a packaging and a method for obtaining baked muffins that includes a base portion of a packaging that substantially retains its shape; however, other products can be obtained. The packaging generally includes a top portion and a base portion; however, this is not required. The base portion is at least partially formed of a plastic material. One non-limiting plastic material is a MYLAR® material; however, other plastic materials can be used. The base portion can be molded into a shape for a sheet of plastic material; however, this is not required. The thickness of the plastic material is generally at least about 4 mils and typically about 4-10 mils; however, other thicknesses can be used. The sheet of plastic material can be molded into a desired shape by the use of molds in combination with certain temperatures and pressures; however, this is not required. However, the packaging can be formed by other means. The type of plastic used for the top portion and/or bottom portion of the packaging is generally a bakable and/or a cryogenic plastic. A bakable plastic material is a material that can be safely heated when baking food products and which will not degrade at a temperature of at least 200° F., typically at least about 300° F., and more typically at least about 400° F. The type of plastic material and the method that is used for forming the plastic material into the base portion of the packaging is selected so that during the proofing and/or baking of the one or more muffins in the packaging, the packaging maintains or substantially maintains its shape. In one particular arrangement, the base portion of the packaging is formed of a plastic material that maintains or substantially maintains its shape during the proofing and/or baking of the one or more muffins in the packaging. The plastic material for the base portion can be selected to be a bakable and/or a cryogenic plastic. In another and/or alternative particular arrangement, the packaging includes a top portion that is formed of a plastic material. The top portion can be designed to be removable prior to the baking of the one or more muffins in the packaging, or be designed to be connected to the base portion when proofing and/or baking the one or more muffins in the packaging. The plastic material for the top portion can be selected to be a bakable and/or a cryogenic plastic. When the top portion is designed to be connected to the base portion when proofing and/or baking the one or more muffins in the packaging, the top portion can be connected to the base portion in a variety of ways (e.g., adhesive, melted bond, pressure bond, etc.). The formed base portion of the packaging can include one or more cavities that are designed to receive a dough product (e.g., dough for the muffin, etc.). The number, size and/or shape of cavities in the base portion of the packaging are non-limiting. Generally, the size and/or shape of cavities in the base portion of the packaging are the same; however, this is not required. Once the base portion of the packaging is formed, the dough product can be placed into all or a portion of the cavities in the base portion of the packaging. Generally, each of the cavities in the base portion of the packaging include a dough product; however, this is not required. The dough product that is placed in the cavities in the base portion can be dough that is not proofed, partially proofed or fully proofed. After the dough product is placed in the one or more cavities in the base portion, the dough product can be 1) allowed to partially or fully proof, 2) baked, and/or 3) stored in a refrigerator or freezer. A top portion can be applied to the base portion of the packaging prior to the dough product being 1) allowed to partially or fully proof, 2) baked, and/or 3) stored in a refrigerator or freezer. The top portion can be used to fully or partially seal the dough product between the base portion and top portion of the packaging; however, this is not required. In one non-limiting arrangement, one or more small openings are formed in the top portion or in a region between the top portion and the base portion so as to form a partially sealed packaging. In another and/or alternative non-limiting arrangement, one or more regions in the top portion or one or more regions between the top portion and the base portion can be designed to form a small opening when a certain predefined pressure in obtained in the covered cavities that include the dough product. After the dough product that is placed in the cavities in the base portion, the dough product can be further processed in various ways:

Option 1—a) the dough is allowed to partially or fully proof in the cavities of the base portion, and b) the partially or fully proofed dough is baked in the base portion.

Option 2—a) the dough is allowed to partially or fully proof in the cavities of the base portion, b) the partially or fully proofed dough is covered by a top portion, c) the dough is baked in the base portion while the top portion is partially or fully sealed to the base portion, and d) the top portion is removed from the base portion after the baking of the dough product.

Option 3—a) the dough is allowed to partially or fully proof in the cavities of the base portion, b) the partially or fully proofed dough is covered by a top portion, c) the dough is frozen or refrigerated, d) the dough is optionally defrosted or allowed to warm to a higher temperature than the freezing and/or refrigeration temperature, e) the dough is optionally allowed to partially or fully proof if not already fully proofed, f) the dough is optionally baked in the base portion while the top portion is unsealed, partially sealed, or fully sealed to the base portion, and g) the top portion is optionally removed from the base portion after the baking of the dough product if the top portion was not removed prior to the baking of the dough.

Option 4—a) the dough is covered by a top portion, b) the dough is frozen or refrigerated prior to being proofed or fully proofed, c) the dough is optionally defrosted or allowed to warm to a higher temperature than the freezing and/or refrigeration temperature, d) the dough is optionally allowed to partially or fully proof while the top portion is unsealed, partially sealed, or fully sealed to the base portion, e) the dough is optionally baked in the base portion while the top portion is unsealed, partially sealed, or fully sealed to the base portion, and f) the top portion is optionally removed from the base portion after the baking of the dough product if the top portion was not removed prior to the baking of the dough.

For the above options that include the baking of the dough product in the base portion of the packaging, the base portion is designed to maintain or substantially maintain its shape during the baking of the one or more dough products in the packaging. Also, for the above options that include the proofing and/or baking of the dough product in the base portion of the packaging, when the packaging includes a top portion and the top portion is not removed from the base portion prior to the proofing and/or baking of the dough product, the packaging can include and/or form small openings to facilitate in the venting of moisture and/or gas from the packaging during the proofing and/or baking of the dough product; however, this is not required. The cross-section shape of the cavity can be circular or polygonal (e.g., square, rectangular, etc.); however, other shapes can be used. In one non-limiting arrangement, the cavity has a generally disc shape. A lip can be designed to partially or fully encircle a recessed portion of the base portion; however, this is not required. The top portion can be designed to be connected to said lip; however, this is not required. The lip can include serrations, slots, depressions, etc. that can be used to separate two or more cavities from one another along the serrations, slots, depressions, etc. without compromising the connection between the top portion and the base portion that is forming at least one of the cavities; however, this is not required. Toppings (e.g., sugar, fruit, cheese, oil, fruits, nuts, spices, etc.) can be applied to the muffins 1) prior to and/or during the refrigeration or freezing of the muffins, or 2) prior to and/or during the proofing and/or baking of the muffins. Although muffins were referenced above, it can be appreciated that many other dough products can be formed, proofed and/or baked using the above-described process (e.g., cinnamon rolls, focaccia and focaccia buns, etc.).

In still yet another and/or alternative non-limiting embodiment, there is provided a packaging and a method for obtaining muffin tops that includes a base portion of a packaging that can at least partially revert back to its original shape during a baking process; however, other products can be obtained. The packaging generally includes a top portion and a base portion; however, this is not required. The base portion is at least partially formed of a plastic material. One non-limiting plastic material is a MYLAR® material; however, other plastic materials can be used. The base portion can be molded into a shape for a sheet of plastic material; however, this is not required. The thickness of the plastic material is generally no more than about 4 mils and typically about 2-3 mils; however, other thicknesses can be used. The sheet of plastic material can be molded into a desired shape by the use of molds in combination with certain temperatures and pressures; however, this is not required. However, the packaging can be formed by other means. The type of plastic used for the top portion and/or bottom portion of the packaging is generally a bakable and/or a cryogenic plastic. The type of plastic material and the method that is used for forming the plastic material into the base portion of the packaging is selected so that during the proofing and/or baking of the one or more muffin tops in the packaging, the packaging does not maintain its shape. In one particular arrangement, the base portion of the packaging is formed of a plastic material that is formed from a flat sheet of plastic material to create a packaging that includes one or more cavities for the receiving of a dough product, and during the proofing and/or baking of the one or more dough products in the base portion, the shape of the formed base portion fully or partially reverts back to its original sheet-like form, thus substantially or fully eliminating the formed cavities in the base portion. The plastic material for the base portion can be selected to be a bakable and/or a cryogenic plastic. In another and/or alternative particular arrangement, the packaging includes a top portion that is formed of a plastic material. The top portion can be designed to be removable prior to the baking of the one or more muffin tops in the packaging, or be designed to be connected to the base portion when proofing and/or baking the one or more muffin tops in the packaging. The plastic material for the top portion can be selected to be a bakable and/or a cryogenic plastic. When the top portion is designed to be connected to the base portion when proofing and/or baking the one or more muffin tops in the packaging, the top portion can be connected to the base portion in a variety of ways (e.g., adhesive, melted bond, pressure bond, etc.). The formed base portion of the packaging can include one or more cavities that are designed to receive a dough product (e.g., dough for the muffin tops, etc.). The number, size and/or shape of cavities in the base portion of the packaging are non-limiting. Generally, the size and/or shape of cavities in the base portion of the packaging are the same; however, this is not required. Once the base portion of the packaging is formed, the dough product can be placed into all or a portion of cavities in the base portion of the packaging. Generally, each of the cavities in the base portion of the packaging include a dough product; however, this is not required. The dough product that is placed in the cavities in the base portion can be dough that is not proofed, partially proofed or fully proofed. After the dough product is placed in the one or more cavities in the base portion, the dough product can be 1) allowed to partially or fully proof, 2) baked, and/or 3) stored in a refrigerator or freezer. A top portion can be applied to the base portion of the packaging prior to the dough product being 1) allowed to partially or fully proof, 2) baked, and/or 3) stored in a refrigerator or freezer. The top portion can be used to fully or partially seal the dough product between the base portion and top portion of the packaging; however, this is not required. In one non-limiting arrangement, one or more small openings are formed in the top portion or in a region between the top portion and the base portion so as to form a partially sealed packaging. In another and/or alternative non-limiting arrangement, one or more regions in the top portion or one or more regions between the top portion and the base portion can be designed to form a small opening when a certain predefined pressure in obtained in the covered cavities that include the dough product. After the dough product that is placed in the cavities in the base portion, the dough product can be further processed in various ways:

Option 1—a) the dough is allowed to partially or fully proof in the cavities of the base portion, and b) the partially or fully proofed dough is baked in the base portion and during the baking process, the base portion partially or fully reverts back to its original sheet-like shape.

Option 2—a) the dough is allowed to partially or fully proof in the cavities of the base portion, b) the partially or fully proofed dough is covered by a top portion, c) the dough is baked in the base portion while the top portion is partially or fully sealed to the base portion and during the baking process, the base portion partially or fully reverts back to its original sheet-like shape, and d) the top portion is removed from the base portion after the baking of the dough product.

Option 3—a) dough allowed to partially or fully proof in the cavities of the base portion, b) the partially or fully proofed dough is covered by a top portion, c) the dough is frozen or refrigerated, d) the dough is optionally defrosted or allowed to warm to a higher temperature than the freezing and/or refrigeration temperature, e) the dough is optionally allowed to partially or fully proof if not already fully proofed, f) the dough is optionally baked in the base portion while the top portion is unsealed, partially sealed, or fully sealed to the base portion, and during the baking process, the base portion partially or fully reverts back to its original sheet-like shape, and g) the top portion is optionally removed from the base portion after the baking of the dough product if the top portion was not removed prior to the baking of the dough.

Option 4—a) the dough is covered by a top portion, b) the dough is frozen or refrigerated prior to being proofed or fully proofed, c) the dough is optionally defrosted or allowed to warm to a higher temperature than the freezing and/or refrigeration temperature, d) the dough is optionally allowed to partially or fully proof while the top portion is unsealed, partially sealed, or fully sealed to the base portion, e) the dough is optionally baked in the base portion while the top portion is unsealed, partially sealed, or sealed or fully sealed to the base portion, and during the baking process, the base portion partially or fully reverts back to its original sheet-like shape, and f) the top portion is optionally removed from the base portion after the baking of the dough product if the top portion was not removed prior to the baking of the dough.

For the above options that include the baking of the dough product in the base portion of the packaging, the base portion is designed to not maintain or substantially maintain its shape during the baking of the one or more dough products in the packaging. However, the base portion can be designed to maintain or substantially maintain it shape during at least a portion of the baking time or process while the base portion is in the oven (e.g., 2% of the total baking process, 5% of the total baking process, 10% of the total baking process, 15% of the total baking process, 20% of the total baking process, 25% of the total baking process, 30% of the total baking process, 35% of the total baking process, 40% of the total baking process, 45% of the total baking process, 50% of the total baking process, 55% of the total baking process, 60% of the total baking process, 65% of the total baking process, 70% of the total baking process, etc.) so that at least a portion of the dough product sets (e.g., the upper region or top portion of the dough product) prior to the base portion of the packaging reverting back to its original shape. For example, when baking muffin tops, during the beginning portion of the baking process, the dough rises and forms the top portion of the muffin. After the top portion of the muffin forms, the continued baking of the dough product causes the top portion to set and retain its shape. After the partial or full setting of the top portion of the muffin, the base portion can begin to revert back to its original flat sheet-like shape. When the thickness of the plastic, type of plastic, and forming process of the plastic for the base portion are properly selected and controlled, the base portion of the packaging can be design to begin reverting back to its original sheet-like shape after the partial or full setting of the top portion of the muffin, but prior to the full setting of the bottom portion of the muffin. As such, when the base portion of the packaging begins to revert back to its original sheet-like shape, the non-fully set bottom portion of the muffin begins to flatten due to the weight of the top portion of the muffin and thus partially or fully reforms and merges with the top portion of the muffin to create a muffin top product. The flattened base portion of the packaging after the baking process makes it convenient to remove the baked muffin tops from the flattened base portion (e.g., by use of a spatula, etc.). Also, for the above options that include the proofing and/or baking of the dough product in the base portion of the container, when the packaging includes a top portion and the top portion is not removed from the base portion prior to the proofing and/or baking of the dough product, the packaging can include and/or form small openings to facilitate in the venting of moisture and/or gas from the packaging during the proofing and/or baking of the dough product; however, this is not required. The cross-section shape of the cavity can be circular or polygonal (e.g., square, rectangular, etc.); however, other shapes can be used. In one non-limiting arrangement, the cavity has a generally disc shape. A lip can be designed to partially or fully encircle a recessed portion of the base portion; however, this is not required. The top portion can be designed to be connected to said lip; however, this is not required. The lip can include serrations, slots, depressions, etc. that can be used to separate two or more cavities from one another along the serrations, slots, depressions, etc. without compromising the connection between the top portion and the base portion that is forming at least one of the cavities; however, this is not required. Toppings (e.g., sugar, fruit, cheese, oil, fruits, nuts, spices, etc.) can be applied to the muffin tops 1) prior to and/or during the refrigeration or freezing of the muffin tops, or 2) prior to and/or during the proofing and/or baking of the muffin tops. Although muffin tops were made reference to above, it can be appreciated that many other dough products can be formed, proofed and/or baked using the above described process (e.g., cinnamon rolls, focaccia and focaccia buns, etc.).

In another and/or alternative non-limiting embodiment, there is provided a packaging and a method for obtaining self-sheeting pizza crust; however, other products can be obtained (e.g. pita bread, etc.). The packaging includes a top portion and a base portion. The base portion is at least partially formed of a plastic material. One non-limiting plastic material is a MYLAR® material; however, other plastic materials can be used. The base portion can be molded into a shape for a sheet of plastic material; however, this is not required. The thickness of the plastic material is generally no more than about 10 mils and typically about 2-6 mils; however, other thicknesses can be used. The sheet of plastic material can be molded into a desired shape by the use of molds in combination with certain temperatures and pressures; however, this is not required. However, the packaging can be formed by other means. The type of plastic used for the top portion and/or bottom portion of the packaging is generally a bakable and/or a cryogenic plastic. The type of plastic material and the method that is used for forming the plastic material into the base portion of the packaging is selected so that during the proofing and/or baking of the one or more pizza dough products in the packaging, the packaging may or may not maintain its shape. In one particular arrangement, the base portion and top portion of the packaging is formed of a plastic material that is formed from a flat sheet of plastic material to create a packaging that includes one or more cavities for the receiving of a pizza dough product when the top and bottom portion are connected together, and during the proofing of the one or more pizza dough products in the base portion, the shape of the formed base portion and top portion is such that it causes the pizza dough product to expand and form more laterally than vertically to form the desired shape of the pizza dough crust; however, this is not required. In another and/or alternative particular arrangement, the base portion and top portion of the packaging is formed of a plastic material that is formed from a flat sheet of plastic material to create a packaging that includes one or more cavities for the receiving of a pizza dough product, and during the proofing and/or baking of the one or more pizza dough products in the base portion, the shape of the formed base portion and/or top portion fully or partially reverts back to its original sheet-like form; however, this is not required. The plastic material for the base portion can be a bakable and/or a cryogenic plastic. In another and/or alternative particular arrangement, the top portion can be designed to be removable prior to the baking of the one or more pizza dough crusts, or be designed to be connected to the base portion when proofing and/or baking the one or more pizza dough crusts in the packaging. The plastic material for the top portion can be a bakable and/or a cryogenic plastic. When the top portion is designed to be connected to the base portion when proofing and/or baking the one or more pizza crusts in the packaging, the top portion can be connected to the base portion in a variety of ways (e.g., adhesive, melted bond, pressure bond, etc.). The number, size and/or shape of cavities in the base portion of the packaging are non-limiting. Generally, the size and/or shape of cavities in the base portion of the packaging are the same; however, this is not required. Once the base portion of the packaging is formed, the dough product can be placed into all or a portion of cavities in the base portion of the packaging. Generally, each of the cavities in the base portion of the packaging include a pizza dough product; however, this is not required. The pizza dough product that is placed in the cavities in the base portion can be dough that is not proofed, partially proofed or fully proofed. After the pizza dough product is placed in the one or more cavities in the base portion, the dough product can be 1) allowed to partially or fully proof, 2) baked, and/or 3) stored in a refrigerator or freezer. A top portion is applied to the base portion of the packaging prior to the dough product being 1) allowed to partially or fully proof, 2) baked, and/or 3) stored in a refrigerator or freezer. The top portion can be used to fully or partially seal the dough product between the base portion and top portion of the packaging; however, this is not required. In one non-limiting arrangement, one or more small openings are formed in the top portion or in a region between the top portion and the base portion so as to form a partially sealed packaging. In another and/or alternative non-limiting arrangement, one or more regions in the top portion or one or more regions between the top portion and the base portion can be designed to form a small opening when a certain pre-defined pressure in obtained in the covered cavities that include the pizza dough product. After the pizza dough product is placed in the one or more cavities in the base portion, the pizza dough product can be further processed in various ways:

Option 1—a) the dough is allowed to partially or fully proof in the cavities of the base portion, and b) the partially or fully proofed and sheeted pizza dough is removed from the packaging and placed on a cooking sheet for baking. The top portion typically remains on the bottom portion during the proofing of the pizza crust; however, this is not required. The top portion can be partially or fully sealed to the base portion during the proofing process; however, this is not required. The partially or fully proofed pizza crust can be refrigerated or frozen prior to being removed from the packaging; however, this is not required. Toppings can be applied to the sheeted pizza crust 1) prior to and/or during the refrigeration or freezing of the pizza crust, or 2) prior to and/or during the baking of the pizza crust.

Option 2—a) the dough is allowed to partially or fully proof in the cavities of the base portion, b) subjecting the partially or fully proofed pizza dough to a press to further press the dough while in the packaging to form the sheeted shape of the pizza crust, and c) the partially or fully proofed and sheeted pizza dough is removed from the packaging after being pressed and is placed on a cooking sheet for baking. The top portion typically remains on the bottom portion during the proofing of the pizza crust; however, this is not required. The top portion can be partially or fully sealed to the base portion during the proofing process; however, this is not required. The partially or fully proof pizza crust can be refrigerated or frozen prior to being removed from the packaging; however, this is not required. The pressing of the dough generally occurs while the top portion is still connected to the base portion; however, this is not required. The pressing of the dough typically occurs any time prior to the top portion being removed from the base portion; however, this is not required. The dough can be pressed more than once; however, this is not required (e.g., prior to and after refrigeration or freezing; prior to and after being shipped; etc.). The dough can also or alternatively be pressed after the top portion has been removed from the base portion; however, this is not required. Toppings can be applied to the sheeted pizza crust 1) prior to and/or during the refrigeration or freezing of the pizza crust, or 2) prior to and/or during the baking of the pizza crust.

Option 3—a) the dough is allowed to partially or fully proof in the cavities of the base portion, and b) the partially or fully proofed and sheeted pizza dough is baked in the bottom portion of packaging. During the baking process, the base portion may or may not be designed to partially or fully revert back to its original sheet-like shape. The top portion typically remains on the bottom portion during the proofing of the pizza crust; however, this is not required. The top portion can be partially fully sealed to the base portion during the proofing process; however, this is not required. The partially or fully proofed pizza crust can be refrigerated or frozen prior to being baked in the packaging; however, this is not required. Toppings can be applied to the sheeted pizza crust 1) prior to and/or during the refrigeration or freezing of the pizza crust, or 2) prior to and/or during the baking of the pizza crust. The top portion can be a) unsealed and/or removed from the base portion prior to and/or during the baking of the pizza crust in the base portion, or b) partially or fully sealed to the base portion during the baking of the pizza crust in the base portion; however, this is not required. If the top portion remains connected to the base portion after the baking process, the top portion is generally removed from the base portion after the baking of the pizza crust. The pizza crust can be optionally frozen and/or refrigerated prior to the dough being allowed to partially or fully proof in the cavities of the base portion. If the pizza crust is refrigerated or frozen a plurality of times prior to the baking process, the pizza crust can undergo multiple proofing step; however, this is not required.

Option 4—a) the dough is allowed to partially or fully proof in the cavities of the base portion, b) subjecting the partially or fully proofed pizza dough to a press to further press the dough while in the packaging to form the sheeted shape of the pizza crust, and c) the partially or fully proofed and sheeted pizza dough is baked in the bottom portion of packaging. During the baking process, the base portion may or may not be designed to partially or fully revert back to its original sheet-like shape. The top portion typically remains on the bottom portion during the proofing of the pizza crust; however, this is not required. The top portion can be partially or fully sealed to the base portion during the proofing process; however, this is not required. The base portion and top portion are designed to form at least one cavity in the packaging. The width of each of the cavities is generally greater than a height of the cavity. Generally, ratio of the width to the height of the cavity is about 2:1, typically 4:1, and more typically about 8:1; however, other ratios can be used. The cross-section shape of the cavity can be circular or polygonal (e.g., square, rectangular, etc.); however, other shapes can be used. In one non-limiting arrangement, the cavity has a generally disc shape. A lip can be designed to partially or fully encircle a recessed portion of the base portion; however, this is not required. The top portion can be designed to be connected to said lip; however, this is not required. The lip can include serrations, slots, depressions, etc. that can be used to separate two or more cavities from one another along the serrations, slots, depressions, etc. without compromising the connection between the top portion and the base portion that is forming at least one of the cavities; however, this is not required. The partially or fully proofed pizza crust can be refrigerated or frozen prior to being baked in the packaging; however, this is not required. The pressing of the dough generally occurs while the top portion is still connected to the base portion; however, this is not required. The pressing of the dough typically occurs any time prior to the top portion being removed from the base portion; however, this is not required. The dough can be pressed more than once; however, this is not required (e.g., prior to and after refrigeration or freezing; prior to and after being shipped; etc.). The dough can also or alternatively be pressed after the top portion has been removed from the base portion; however, this is not required. The press step can be a manual or automated pressing process. The pressing step generally occurs after the dough has been partially or fully proofed and while said dough is still positioned in the cavity of the packaging and while the top portion is still connected to the bottom portion. The press step, when used, can be used to cause a height of the proofed dough to be reduced and also cause the dough to further spread toward peripheral edges of the cavity of the packaging. The press step can also be used to partially or fully form a crust rim and a recess region that is encircled by the crust rim; however, this is not required. Toppings (e.g., pizza sauce, cheese, oil, fruits, meat, seafood, vegetables, nuts, spices, etc.) can be applied to the sheeted pizza crust 1) prior to and/or during the refrigeration or freezing of the pizza crust, or 2) prior to and/or during the baking of the pizza crust. The top portion can be a) unsealed and/or removed from the base portion prior to and/or during the baking of the pizza crust in the base portion, or b) partially or fully sealed to the base portion during the baking of the pizza crust in the base portion; however, this is not required. If the top portion remains connected to the base portion after the baking process, the top portion is generally removed from the base portion after the baking of the pizza crust. The pizza crust can be optionally frozen and/or refrigerated prior to the dough being allowed to partially or fully proof in the cavities of the base portion. If the pizza crust is refrigerated or frozen a plurality of times prior to the baking process, the pizza crust can undergo multiple proofing step; however, this is not required.

For the above options that include the baking of the dough product in the base portion of the packaging, the base portion may or may not be designed to maintain or substantially maintain its shape during the baking of the one or more dough products in the packaging. Also, for the above options that include the proofing and/or baking of the dough product in the base portion of the container, when the packaging includes a top portion and the top portion is not removed from the base portion prior to the proofing and/or baking of the dough product, the packaging can include and/or form small openings to facilitate in the venting of moisture and/or gas from the packaging during the proofing and/or baking of the dough product; however, this is not required. Although pizza crust was referenced above, it can be appreciated that many other dough products can be formed, proofed and/or baked using the above described process (e.g., pita bread, etc.).

It is one non-limiting objective of the invention to provide a packaging that simplifies the packaging, freezing, proofing and/or baking of a dough product.

It is another and/or alternative objective of the invention to provide a packaging that reduces the proofing and/or baking times of dough products.

It is still another and/or alternative objective of the invention to provide a packaging that includes a base portion and a removable top portion.

It is yet another and/or alternative objective of the invention to provide a packaging that is bakable.

It is still yet another and/or alternative objective of the invention to provide a packaging that can increase the shelf life of baked dough products.

It is another and/or alternative objective of the invention to provide a packaging that results in baked products having increased moisture content.

It is still another and/or alternative objective of the invention to provide a packaging that results in baked products having reduced moisture content.

It is another and/or alternative objective of the invention to provide a packaging having an easy to peel-off top portion.

It is yet another and/or alternative objective of the invention to provide a packaging that has a self-venting feature.

It is still yet another and/or alternative objective of the invention to provide a packaging that allows for vacuum sealing of dough products.

It is another and/or alternative objective of the invention to provide a packaging that flattens and/or forms dough products during the proofing and/or baking of the dough products.

It is still another and/or alternative objective of the invention to provide a packaging that increases food safety.

It is yet another and/or alternative objective of the invention to provide a packaging that reduces food contamination.

It is still yet another and/or alternative objective of the invention to provide a packaging that can control the $CO_2$ content of the dough product during proofing and/or baking of the food product.

It is another and/or alternative objective of the invention to provide a packaging that controls the carbonic acid breakdown of gluten cell structures in a dough product during the proofing and/or baking of the dough product.

It is still another and/or alternative objective of the invention to provide a packaging that increases the ease and/or reduces the cost to package, freeze, proof, bake and/or transport dough products.

It is yet another and/or alternative objective of the invention to provide a packaging that provides an advanced product delivery and baking strategy that utilizes the packaging.

It is still yet another and/or alternative objective of the invention to provide a packaging that enables high speed manufacturing of dough and batter, improves food safety, and eliminates a host of traditional labor activities associated with the preparation and baking of dough and batter.

It is another and/or alternative objective of the invention to provide a packaging that can be used with dough products to provide greater shelf life by controlling the moisture content of the dough product.

It is still another and/or alternative objective of the invention to provide a method of processing a dough product that includes 1) making a dough product on a table line and/or in some other process, 2) depositing the dough product, generally in line, into containers or packaging that are made of or include a plastic material, 3) sealing the dough product in the container or packaging, 4) freezing the dough product, optionally shipping the frozen dough product to a customer (e.g., store, restaurant, etc.), 5) thawing the sealed dough product, 6) proofing the dough product in a sealed or unsealed container or packaging, and/or 7) baking the dough product in the container or packaging while the dough product is sealed or unsealed in the container or packaging. One or more portions of the packaging (e.g., base portion, etc.) can be designed to retain its form during the baking process or revert partially or fully to its original flat sheet-like form.

It is yet another and/or alternative objective of the invention to form a base portion and/or a top portion of a container or packaging from a roll of plastic film.

It is still yet another and/or alternative objective of the invention to provide a packaging that eliminates the need for panning of dough products, the washing of pans or containers, and/or cleanup after the baking of the dough product.

It is another and/or alternative objective of the invention to provide a packaging that can be used to proof and/or bake dough products that does not require high-skilled labor for the packaging, storing, proofing and/or baking of the dough product.

It is still another and/or alternative objective of the invention to provide a packaging that requires less equipment and/or involves less cost to package, store, proof and/or bake dough products.

Another and/or alternative objective of the invention is to provide a method for manufacturing a container or packaging that includes the steps of 1) providing a film from a roll of plastic film, and 2) forming the plastic film into a container or packaging by the use of presses, cavity molds, tension, heat and/or pressure, which container or packaging can include one or more cavities designed to receive an individual dough product in each cavity or well. One or more portions of the packaging (e.g., base portion, etc.) can be designed to retain its form during the baking process or revert partially or fully to its original flat sheet-like form.

It is still yet another and/or alternative objective of the invention is to provide a method for sealing a dough product in a formed container or packaging that includes the steps of 1) providing a film from a roll of plastic film, 2) forming the plastic film into a base portion of a container or packaging by the use of presses, cavity molds, tension, heat and/or pressure, which container or packaging can include one or more cavities or wells designed to receive an individual dough product in each cavity or well (e.g., forming process generally taking about 1-60 seconds), 3) depositing a dough product (e.g., hand, robotics, etc.) into the one or more cavities of the base portion of the container or packaging, wherein a single dough product is generally inserted into a single cavity or well, and 4) sealing the one or more dough products in the container or packaging by placing and securing a film (e.g., plastic film, etc.) on the top of the base portion of the container or packaging by use of a securing arrangement (e.g., adhesive, melted seam, pressure-fit connection, etc.). One or more portions of the packaging (e.g., base portion, etc.) can be designed to retain its form during the baking process or revert partially or fully to its original flat sheet-like form.

It is another and/or alternative objective of the invention is to provide a method for sealing a dough product in a formed container or packaging and then proofing and baking the dough product that includes the steps of 1) providing a film from a roll of plastic film, 2) forming the plastic film into a base portion of a container or packaging by the use of presses, cavity molds, tension, heat and/or pressure, which container or packaging can include one or more cavities designed to receive an individual dough product in each cavity or well (e.g., forming process generally taking about 1-60 seconds), 3) depositing a dough product (e.g., hand, robotics, etc.) into the one or more cavities of the base portion of the container or packaging, wherein a single dough product is generally inserted into a single cavity or well, 4) sealing the one or more dough products in the container or packaging by placing and securing a top film (e.g., plastic film, etc.), that may or may not be formed into a shape other than a planar sheet of material, on the top of the base portion of the container or packaging by use of a securing arrangement (e.g., adhesive, melted seam, pressure-fit connection, etc.), 5) freezing the dough product in the sealed container or packaging, 6) proofing the frozen dough product while the dough product is sealed or unsealed in the container or packaging, and wherein the unsealing can occur during proofing by the release of the top film from the base portion of the container or packaging after a predetermined pressure in a cavity or well is exceeded, and 7) baking the proofed dough product in the container or packaging while the dough product is sealed or unsealed in the container or packaging, and wherein the unsealing can occur during baking by the release of the top film from the base portion of the container or packaging after a predetermined pressure in a cavity is exceeded. One or more portions of the packaging (e.g., base portion, etc.) can be designed to retain its form during the baking process or revert partially or fully to its original flat sheet-like form.

It is still another and/or alternative objective of the invention to provide a packaging that 1) increases food safety, 2) reduces food contamination, 3) results in faster proofing times for the dough product, 4) results in faster baking times for the dough product, 5) results in more uniform baking of the dough product, 6) reduces the handling of the dough product from humans during the packaging, proofing and baking process for the dough product, 7) simplifies the proofing of the dough product, 8) simplifies the baking of the dough product, 9) simplifies the packaging of the dough product, 10) simplifies the storage of the dough product, 11) simplifies the shipping of the dough product, 12) at least partially shapes the dough product during proofing, 13) at least partially shapes the dough product during baking, 14) changes its shape during the proofing and/or baking process, 15) at least partially controls the moisture content of the bakery product during the proofing and/or baking process, 16) at least partially controls the gas pressure of the bakery product in the cavity during the proofing and/or baking process, and/or 17) at least partially controls the gas content of the one or more gasses in the cavity during the proofing and/or baking process.

It is yet another and/or alternative objective of the invention to provide a packaging that can be used to bake muffins.

It is yet another and/or alternative objective of the invention to provide a packaging that can be used to bake muffin tops.

It is still yet another and/or alternative objective of the invention to provide a packaging that can be used to form self-sheeting pizza crust.

It is another and/or alternative objective of the invention to provide a packaging that can be used to bake cinnamon rolls.

It is still another and/or alternative objective of the invention to provide a packaging that can be used to bake focaccia and/or focaccia buns.

These and other objects and advantages will become apparent to those skilled in the art upon reading and following the description taken together with the accompanying drawings.

BRIEF DESCRIPTION OF THE DRAWINGS

Reference may now be made to the drawings which illustrate information related to non-limiting embodiments of the invention:

FIG. 5 illustrates the container of FIG. 1 in a freezer or refrigerator wherein the container includes food product positioned in the cavities of the base portion and the top portion of the container is secured to the base portion;

FIG. 6 illustrates the container of FIG. 1 on a proofing or oven rack and wherein the container includes food product positioned in the cavities of the base portion and the top portion is partially removed from the base portion;

FIG. 15 illustrates the container of FIG. 10 in a freezer or refrigerator wherein the container includes food product positioned in the cavities of the base portion and the top portion of the container secured to the base portion;

FIG. 16 illustrates the container of FIG. 10 on a proofing or oven rack and wherein the container includes food product positioned in the cavities of the base portion and the top portion is secured to the base portion;

DETAILED DESCRIPTION OF THE INVENTION

Figure 1:
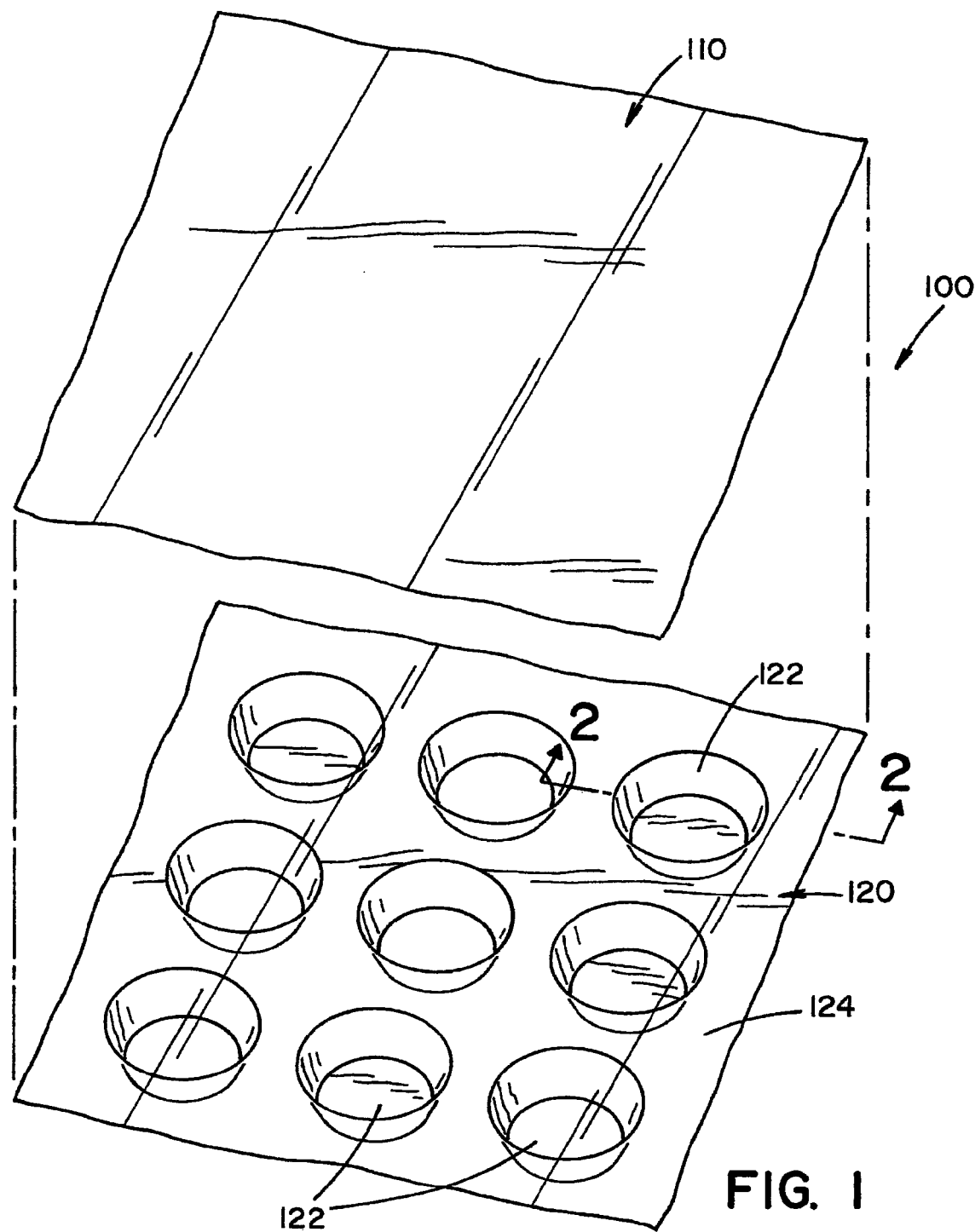
FIG. 1 is a front elevation view of a container in accordance with the present invention illustrating an exploded view of the top portion and base portion of the container.

Referring now to the drawings wherein the showings are for the purpose of illustrating embodiments of the invention only and not for the purpose of limiting the same, FIGS. 1-9 illustrate one non-limiting container in accordance with the present invention and a non-limiting method for packaging, proofing and/or baking dough products in the container of the present invention. The present invention describes a novel dough processing approach and a novel process for forming and using packaging for a dough product.

Figure 2:
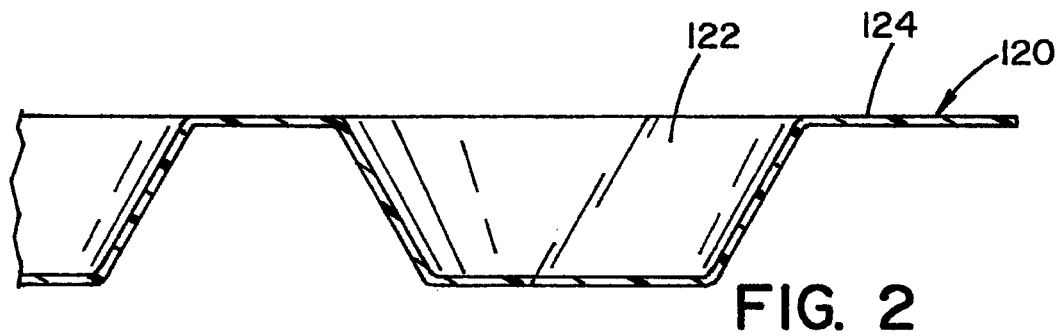
FIG. 2 is a cross-sectional view along lines 2-2 of FIG. 1.

As illustrated in FIG. 1, there is a container 100 that includes a top portion 110 and a base portion 120. The base portion and top portion are generally formed of a plastic material. The type of plastic material used for the top portion and the base portion can be the same or different. Also, the color, transparency, and/or thickness of the top portion and the base portion can be the same or different. Generally, the base portion is formed of a bakable plastic material; however, this is not required. The top portion may or may not be a bakable plastic material. The top portion and bottom portion are generally formed of a cryogenic plastic material; however, this is not required. The top portion is illustrated as being a generally flat, planar sheet of material that has a generally uniform thickness; however, this is not required. The base portion is illustrated as having one or more cavities or wells 122. The number, size and/or shape of the cavities in the base portion are non-limiting. As illustrated in FIGS. 1 and 2, the size and shape of the cavities in the base portion are generally the same; however, this is not required.

The base portion is generally formed from a generally flat, planar sheet of plastic material that has been subjected to a forming process to the one or more cavities in the base portion. The type of forming process used to form the base portion is non-limiting. As will be described in more detail, the base portion is formed with a certain type of material under certain forming parameters such that during the baking of the food product in the one or more cavities, the base portion reverts partially or fully back to its original generally flat, planar shape, thereby resulting in the partial or full elimination of the formed cavities on the base portion after the baking process has been completed.

Figure 3:
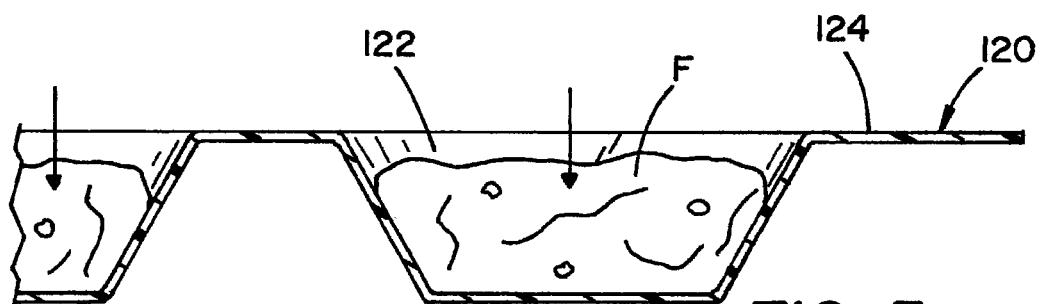
FIG. 3 is a similar view as of FIG. 1 but also illustrating a food product positioned in the cavity of the base portion.
Figure 4:
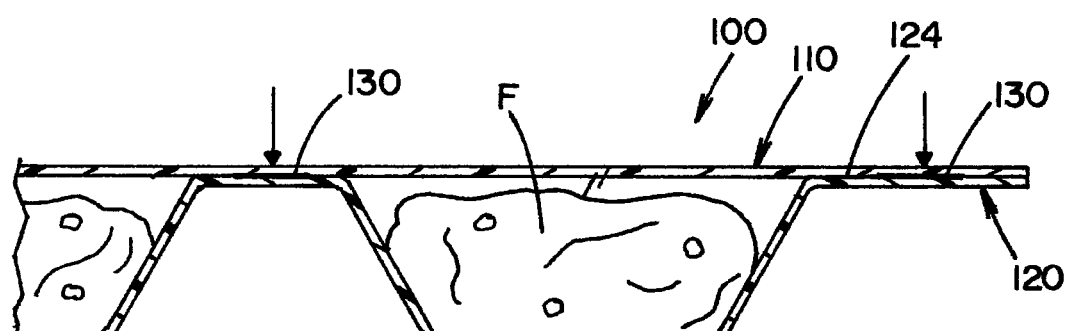
FIG. 4 is similar view as of FIG. 3 but also illustrating the top portion of the container being secured to an upper surface of the base portion.

Referring now to FIG. 3, a food product F is illustrated by the arrow as being inserted into the one or more cavities 122 of the base portion. The type of food product is non-limiting. Generally, the food product is a dough product. The dough product, when inserted into the cavity, may be in a state prior to proofed, may be a partially proofed or may be a fully proofed. Generally, the food product is a dough product that has not been fully proofed when inserted into the one or more cavities of the base portion. Generally, the same amount and/or type of product is inserted into each cavity of the base portion; however, this is not required. The process for inserting the food product into the one or more cavities can be manual, semi-automated or fully automated. During the process of inserting the food product into the one or more cavities, the ambient temperature can be maintained at a cool temperature (e.g., less than 60° F., less than 50° F., less than 40° F., etc.) to limit or prevent the food product from proofing; however, this is not required.

After the food product is inserted into the one or more cavities, the top portion 110 is applied onto and secured to an upper surface 124 of the base portion as illustrated in FIG. 3. The manner in which the top portion is connected to the base portion is non-limiting. In one non-limiting arrangement, an adhesive 130, or pressed or melted seam is used to secure the top portion to the base portion. The top portion can be secured to the base portion such that the top portion fully prevents gas and/or moisture from entering and/or escaping the cavity that includes the food product while the top portion is secured to the base portion; however, this is not required. The top portion can be secured to the base portion such that the top portion allows the controlled release of gas and/or moisture from escaping the cavity that includes the food product while the top portion is secured to the base portion during the proofing and/or baking of the food product; however, this is not required. In such an arrangement, 1) the top portion and/or the base portion can include one or more small opening, 2) one or more small openings exist between the top portion and the base portion, and/or 3) one or more small openings are formed between the top portion and the base portion during the proofing and/or baking of the food product once a certain pressure within the cavity is obtained. Further explanation of such small openings that can be optionally used in the container of FIGS. 1-8 will be discussed below with respect to the other embodiments of the invention as illustrated in FIGS. 10-18.

Referring now to FIG. 5, the container 100 that includes the food product F is illustrated as being positioned in a refrigerator or freezer R to either cool or freeze the food product in the container. The refrigerator or freezer can include a refrigerated vehicle (e.g., truck, train, ship, etc.), a refrigerator or freezer located a particular facility, etc. The food product in the container that is placed in the refrigerator or freezer can be stored in the refrigerator or freezer for later processing (e.g., proofing and/or baking) or to be shipped to a bakery, store, restaurant, etc. The step of refrigerating or freezing the food product in the container is an optional step. The time period that the food product in the container is refrigerated or frozen is non-limiting. As can be appreciated, the food product after it has been partially or fully proofed can be refrigerated or frozen; however, this is not required. As such, the food product in the container can be 1) refrigerated or frozen after the top portion has been secured to the bottom portion, 2) refrigerated or frozen after the food product has been partially or fully proofed, or 3) refrigerated or frozen after the top portion has been secured to the bottom portion, then taken out of the refrigerator or freezer to be partially or fully proofed, and then again refrigerated or frozen. As can be appreciated, the number of times that the food product is refrigerated or frozen after the top portion has been secured to the bottom portion is non-limiting. As can be appreciated, the food product in the container can be moved from the freezer to a refrigerator, moved between different freezers, moved between different refrigerator and number of times.

Referring now to FIG. 6, the top portion 110 is illustrated by the arrow as being partially or fully removed from the base portion. Generally, the top portion is partially or fully removed from the base portion during the proofing and/or baking of the food product; however, this is not required. In one non-limiting method, the top portion is partially or fully removed from the base portion during the proofing and/or baking of the food product. In another non-limiting method, the top portion remains on the base portion during the proofing of the food product and then is partially or fully removed from the base portion during the baking of the food product. When the top portion remains on the base portion during the proofing of the food product, the food product can be 1) sealed in the cavity so as to prevent gas and/or liquid form entering and/or exiting the cavity during the proofing process while the top portion is secured to the base portion, and 2) partially sealed wherein gas and/or liquid is controllably released during the proofing process from the cavity through one or more pre-existing and/or formed small openings.

Figure 7:
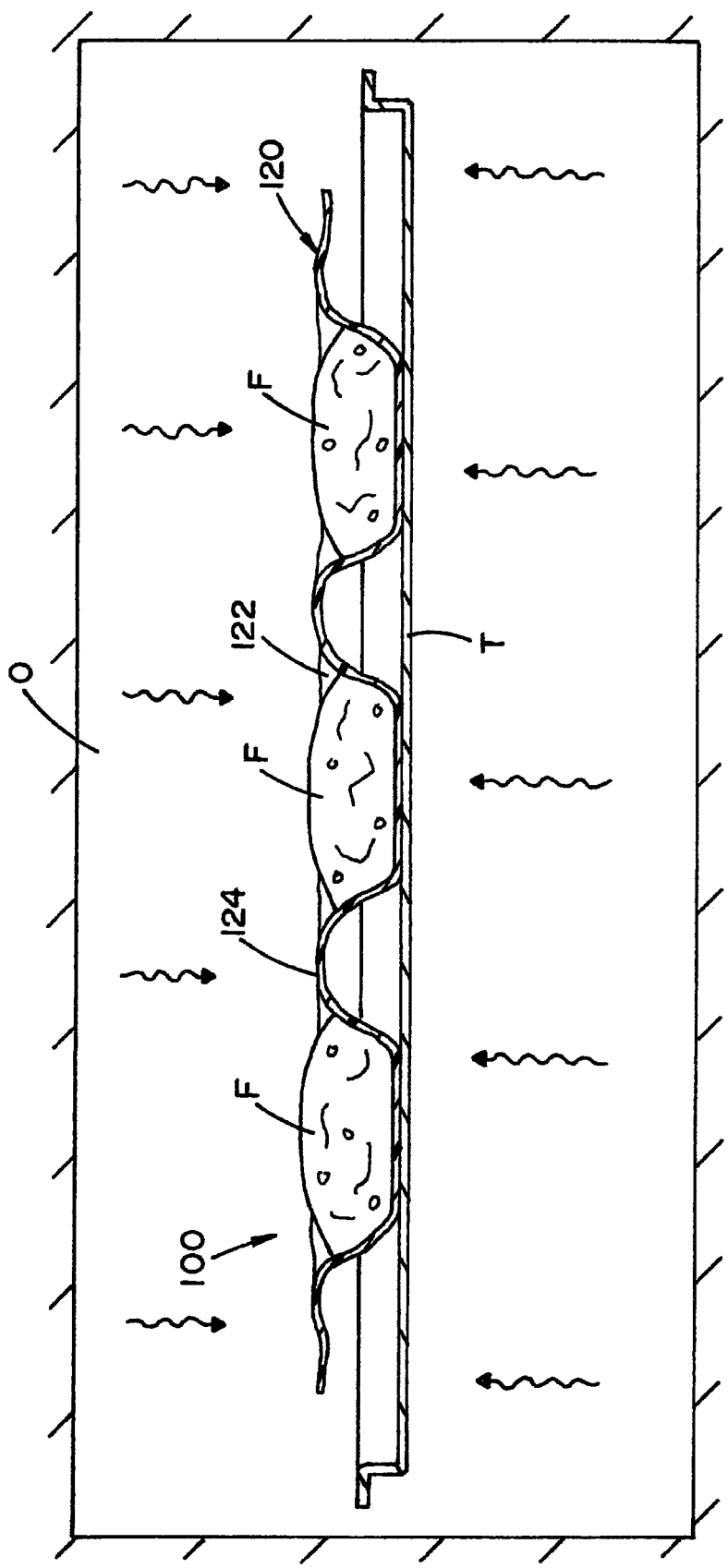
FIG. 7 illustrates the container of FIG. 1 on an oven rack and wherein the container includes food product positioned in the cavities of the base portion and the top portion is fully removed from the base portion.
Figure 8:
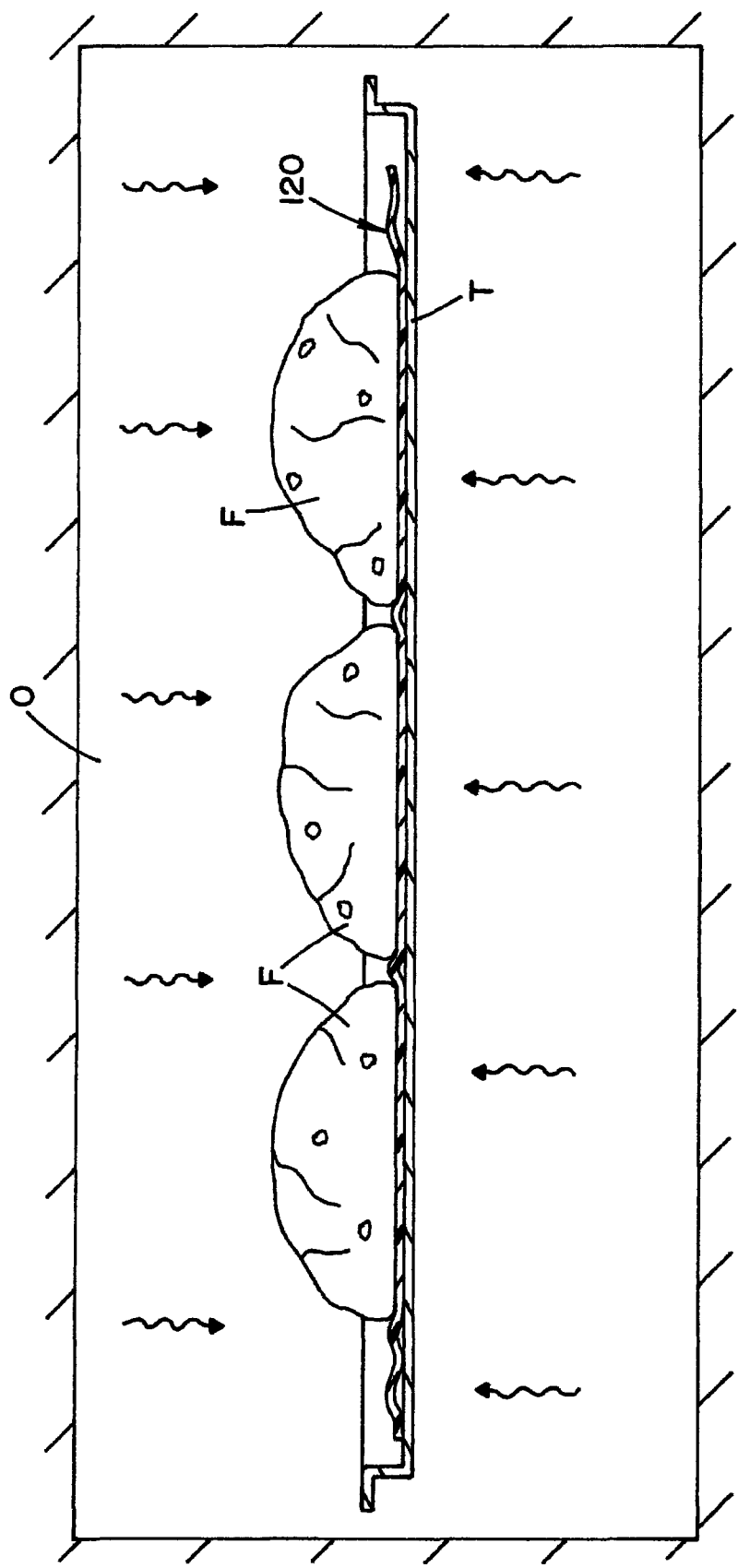
FIG. 8 illustrates the container of FIG. 7 wherein after a certain time of baking the base portion of the container at least partially reverts back to its original shape.
Figure 9:
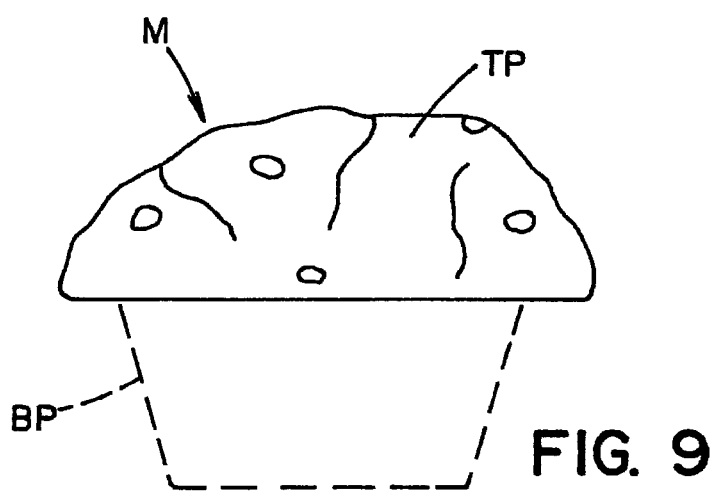
FIG. 9 illustrates a non-limiting food product that is formed by the container of FIG. 1 after the food product has been baked.

Referring now to FIG. 7, the container 100 that includes food product P in the one or more cavities of the base portion 120 is illustrated as being positioned on a baking rack or tray T and being placed in an oven O to bake the food product. The top portion 110 is illustrated as being fully removed from the base portion during the baking process; however, this is not required. During the initial baking process, base portion 120 substantially retains its shape. Generally, the base portion is designed to retain its shape for at least about 2% of the total baking time of the food product, and typically at least about 5% total baking time of the food product. After a certain amount of time in the oven, the base portion begins to lose its form and revert back to its original shape that existed prior to the forming of the base portion. Generally, the base portion has completed the shape reversion process by at least 99% of the total baking time of the food product, typically by at least 95% of the total baking time of the food product, more typically by at least 90% of the total baking time of the food product, and still more typically by at least 85% of the total baking time of the food product. As illustrated in FIG. 8, the base portion has substantially reverted back to its original flat, planar shape and the cavities 122 are 80-100% non-existent. This novel feature of the base portion during the baking process of the food product can have the non-limiting advantages of 1) simplifying the removal of the food product from the base portion after the baking process, 2) providing for more uniform baking of the food product, 3) provide for more uniform cooling of the food product after baking, and/or 4) creating novel shaped food products. With regard to the last non-limiting advantage, bakery goods that resemble the top of a muffin can be formed by the novel container of the present invention. Muffins typically include a muffin top portion that is crispier than the softer bottom portion. The top portion also commonly includes added sugar and/or other types of toppings added prior to, during and/or after the baking process of the muffin. Many consumers only desire to consume the top portion or muffin top portion of the muffin and then dispose of the bottom portion. The base portion of the present invention can be used to form a bakery good that looks very similar to just the top portion TP of a muffin M as illustrated in FIG. 9. The bottom portion BP of the muffin is eliminated or substantially eliminated by the use of the container of the present invention. The absence of the bottom portion of the muffin is the result of the base portion of the container reverting back to its original flat shape during the baking process. The reversion of the base portion back to its original shape can be designed such that the top portion of the muffin at least partially sets in its shape prior to the reversion of the base portion back to its original shape. Since the bottom portion of a muffin typically cooks slower that the top surface of the top portion of the muffin, the bottom portion of the muffin slowly gets absorbed into the top portion of the muffin as the base portion reverts back to its original shape. As such, at the completion of the baking process for the muffin, the typically bottom portion of the muffin has been fully or substantially been incorporated into the top portion of the muffin and the final baked food product resembles only the top portion of a standard muffin. The dashed line illustrated in FIG. 9 represents that muffin as lacking a bottom portion at the completion of the baking process. As can be appreciated, one or more toppings can be optionally added to the top portion of the muffin prior to, during and/or after the baking process of the muffin. As can be appreciated, many other food products can be baked in the container of FIGS. 1-8.

Referring now to FIGS. 10-18, another non-limiting embodiment of the container is illustrated. Container 200 includes a top portion 210 and a base portion 220. The base portion and top portion are generally formed of a plastic material. The type of plastic material used for the top portion and the base portion can be the same or different. Also, the color, transparency, and/or thickness of the top portion and the base portion can be the same or different. Generally, the base portion is formed of a bakable plastic material; however, this is not required. The top portion may or may not be a bakable plastic material. The top portion and bottom portion are generally formed of a cryogenic plastic material; however, this is not required. The top portion is illustrated as being a generally flat, planar sheet of material that has a generally uniform thickness; however, this is not required. The base portion is illustrated as having one or more cavities or wells 222. The number, size and/or shape of the cavities in the base portion are non-limiting. As illustrated in FIGS. 10, 12, 15-18, the size and shape of the cavities in the base portion are generally the same; however, this is not required.

The base portion is generally formed from a generally flat, planar sheet of plastic material that has been subjected to a forming process to the one or more cavities in the base portion. The type of forming process used to form the base portion is non-limiting.

Figure 13:
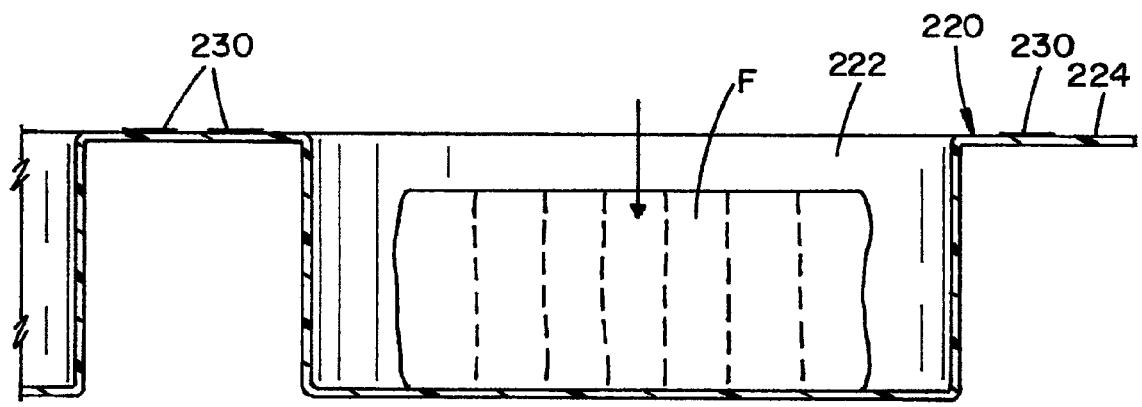
FIG. 13 is a cross-sectional view along lines 13-13 of FIG. 12 but absent the top portion of the container.

Referring now to FIG. 13, a food product F is illustrated by the arrow as being inserted into the one or more cavities 222 of the base portion. The type of food product is non-limiting. Generally, the food product is a dough product. The dough product, when inserted into the cavity, may be in a state prior to proofed, may be a partially proofed or may be a fully proofed. Generally, the food product is a dough product that has not been fully proofed when inserted into the one or more cavities of the base portion. Generally, the same amount and/or type of product is inserted into each cavity of the base portion; however, this is not required. The process for inserting the food product into the one or more cavities can be manual, semi-automated or fully automated. During the process of inserting the food product into the one or more cavities, the ambient temperature can be maintained at a cool temperature (e.g., less than 60° F., less than 50° F., less than 40° F., etc.) to limit or prevent the food product from proofing; however, this is not required.

Figure 10:
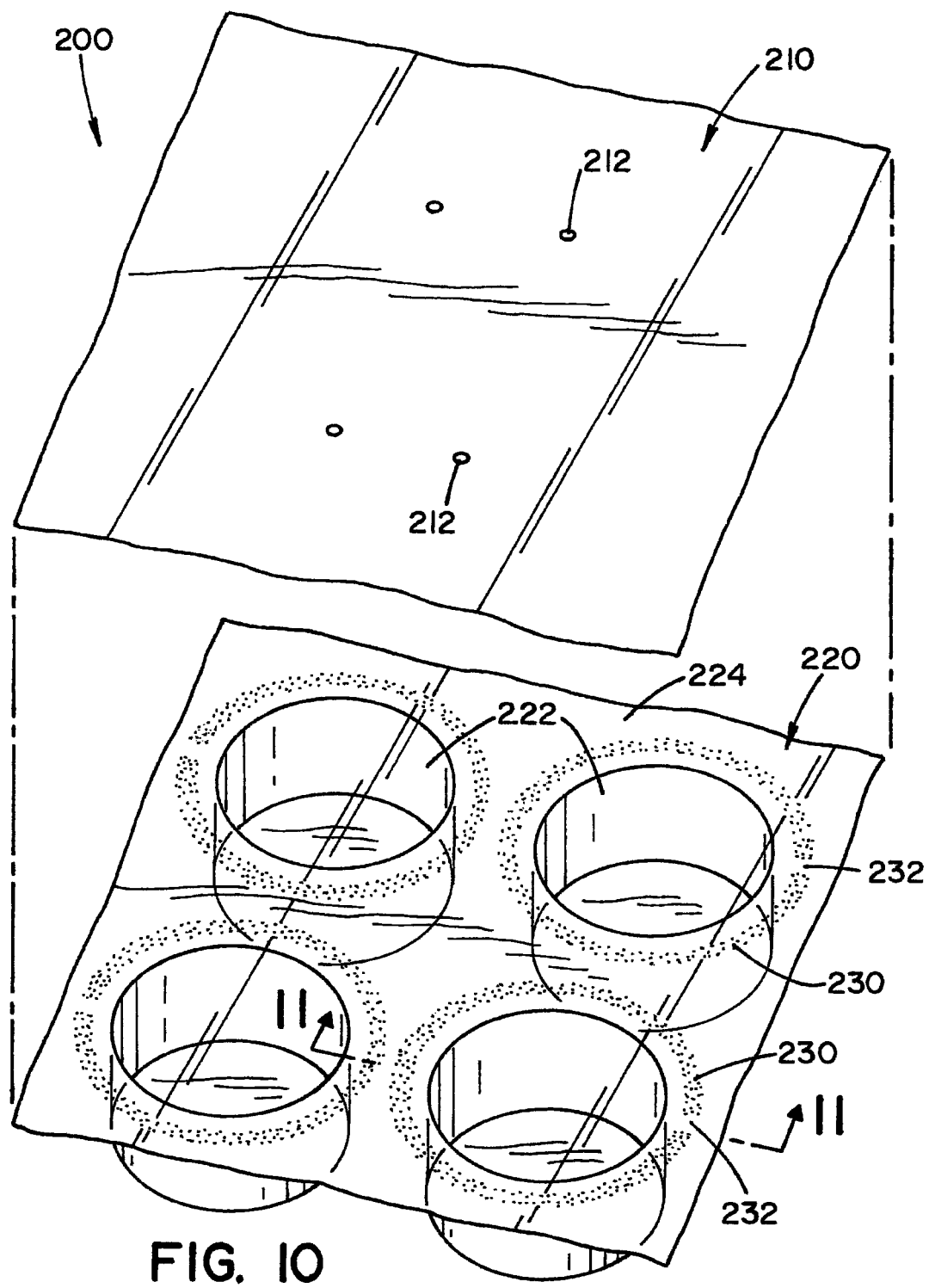
FIG. 10 is a front elevation view of another non-limiting container in accordance with the present invention wherein the container includes a top portion and a base portion of the container.
Figure 11:
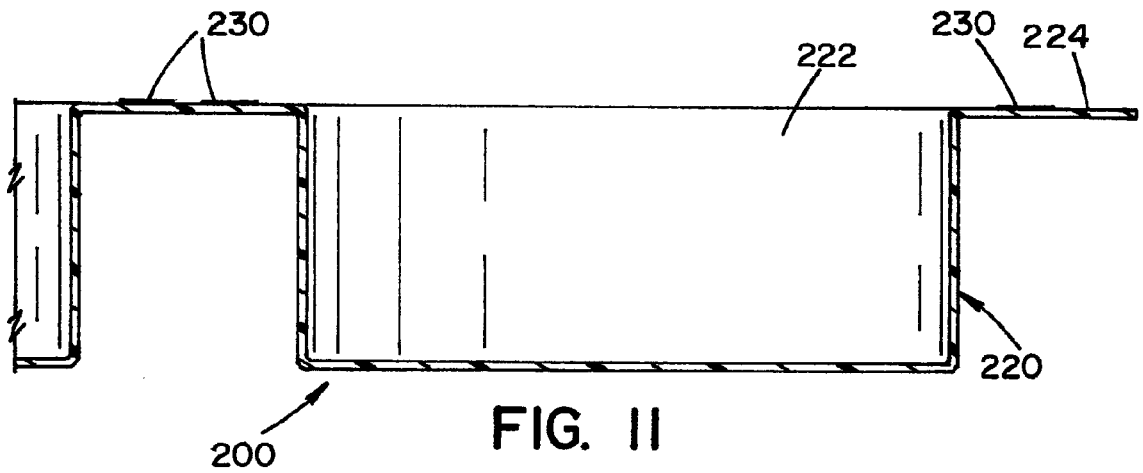
FIG. 11 is a cross-sectional view along lines 11-11 of FIG. 10.
Figure 12:
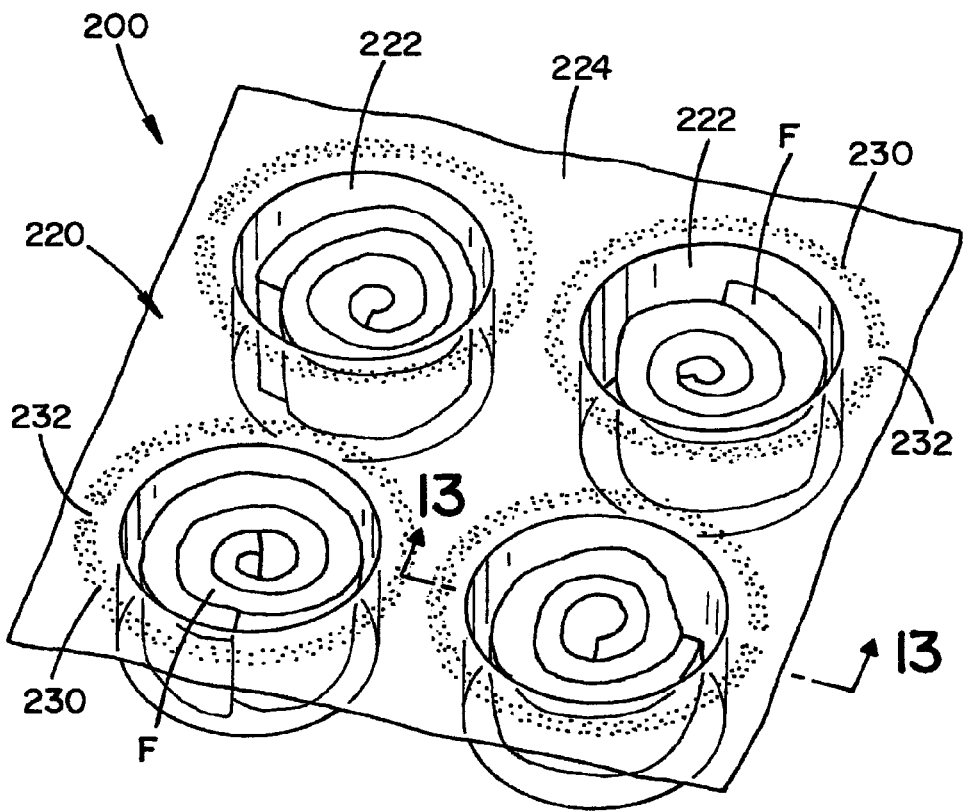
FIG. 12 illustrates the container of FIG. 10 that includes food product positioned in the cavities of the base portion and the top portion of the container is secured to an upper surface of the base portion.
Figure 14:
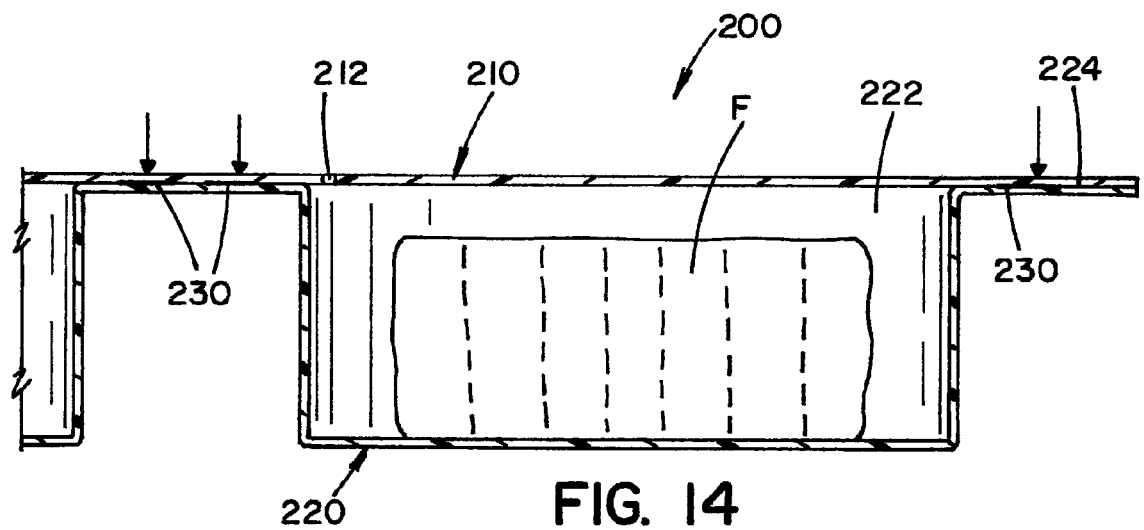
FIG. 14 is similar view as of FIG. 13 but includes the top portion of the container.

After the food product F is inserted into the one or more cavities, the top portion 210 is applied onto and secured to an upper surface 224 of the base portion as illustrated in FIG. 14. The manner in which the top portion is connected to the base portion is non-limiting. In one non-limiting arrangement, an adhesive 230, or pressed or melted seam is used to secure the top portion to the base portion. The top portion can be secured to the base portion such that the top portion fully prevents gas and/or moisture from entering and/or escaping the cavity that includes the food product while the top portion is secured to the base portion; however, this is not required. The top portion can be secured to the base portion such that the top portion allows the controlled release of gas and/or moisture from escaping the cavity that includes the food product while the top portion is secured to the base portion during the proofing and/or baking of the food product; however, this is not required. In such an arrangement, 1) the top portion and/or the base portion can include one or more small opening, 2) one or more small openings exist between the top portion and the base portion, and/or 3) one or more small openings are formed between the top portion and the base portion during the proofing and/or baking of the food product once a certain pressure within the cavity is obtained. As illustrated in FIGS. 10 and 12, an adhesive 230 can be used to secure the top portion to the base portion. The adhesive can be non-continuously applied about one or more cavities; however, this is not required. When the adhesive is non-continuously applied about one or more cavities, one or more gaps 232 in the adhesive layer can be intentionally formed such that when the top portion is applied to the base portion, an opening or gap 226 exists between the top portion and the base portion of the container to allow the controlled release of gas and/or liquid from one or more cavities during the proofing and/or baking of the food product. As can be appreciated, all or less than all of the cavities can include one or more gaps or spaces. As can also be appreciated, the top portion can optionally include one or more small openings 212 as an alternative to or in addition to the use of one or more gaps 226. The optional use of small openings 212 allows for the controlled release of gas and/or liquid from one or more cavities during the proofing and/or baking of the food product. As can be appreciated, all or less than all of the cavities can be covered by a section of the top portion that includes one or more of the small openings 212. Generally, the one or more small openings, when used, are preformed in the top portion prior to the top portion being connected to the base portion and/or preformed between the top and/or base portion when the top portion is connected to the base portion; however, this is not required. As can further be appreciated, a breakable bond between the top portion and the base portion can optionally be formed so that after a predefined level of pressure is obtained in a cavity during the proofing and/or baking of a food product, a small space or gap is formed between the top portion and the base portion. The use of a breakable bond can be used as an alternative to or in addition to the use of one or more gaps 226 and/or small openings 212. The breakable bond, when used, can be formed by a variety of ways: 1) use of different adhesives, 2) use of different thickness and/or widths of adhesive in different regions about the perimeter of one or more cavities, 3) the use of release agents, and/or 4) use of heat release agents. The use of one or more openings can be used to control the moisture content of the food product during the proofing and/or baking process, the pH of the food product during the proofing and/or baking process, the size and/or structure of the gas cells in the food product, the rate and/or degree to which the baking product rises during the proofing process, the rate at which the food product bakes, and/or the shape of the product that is formed during the proofing and/or baking process.

Referring now to FIG. 15, the container 200 that includes the food product F is illustrated as being positioned in a refrigerator or freezer R to either cool or freeze the food product in the container. The refrigerator or freezer can include a refrigerated vehicle (e.g., truck, train, ship, etc.), a refrigerator or freezer located a particular facility, etc. The food product in the container that is placed in the refrigerator or freezer can be stored in the refrigerator or freezer for later processing (e.g., proofing and/or baking) or to be shipped to a bakery, store, restaurant, etc. The step of refrigerating or freezing the food product in the container is an optional step. The time period that the food product is in the container refrigerated or frozen is non-limiting. As can be appreciated, the food product, after it has been partially or fully proofed, can be refrigerated or frozen; however, this is not required. As such, the food product in the container can be 1) refrigerated or frozen after the top portion has been secured to the bottom portion, 2) refrigerated or frozen after the food product has been partially or fully proofed, or 3) refrigerated or frozen after the top portion has been secured to the bottom portion, then taken out of the refrigerator or freezer to be partially or fully proofed, and then again refrigerated or frozen. As can be appreciated, the number of times that the food product is refrigerated or frozen after the top portion has been secured to the bottom portion is non-limiting. As can be appreciated, the food product in the container can be moved from the freezer to a refrigerator, moved between different freezers, moved between different refrigerators any number of times.

Referring now to FIG. 16, gas and/or liquid is illustrated as escaping from the one or more cavities 222 through the small openings 212 during the proofing of the food product. As can be appreciated, gas and/or liquid can also or alternatively escape through one or more gaps 226. During proofing process, the food product generally expands in the cavity as illustrated by the arrows; however, this is not required. When one or more small openings and/or gaps 226 are used, the size and number of small openings and/or gaps 226 are generally selected such that gas and/or liquid only or substantially only exits the cavity, and little if any gas and/or liquid enters the one or more cavities during proofing and/or baking process. In one non-limiting arrangement, the size and number of small openings and/or gaps 226 are selected such that during at least 40% of the proofing process, there is a pressure in the cavities that is greater than the ambient pressure (e.g., 1 atm, 740-780 torr). In another and/or alternative non-limiting arrangement, the size and number of small openings and/or gaps 226 are selected such that during at least 40% of the baking process, there is a pressure in the cavities that is greater than the ambient pressure (e.g., 1 atm, 740-780 torr).

Figure 17:
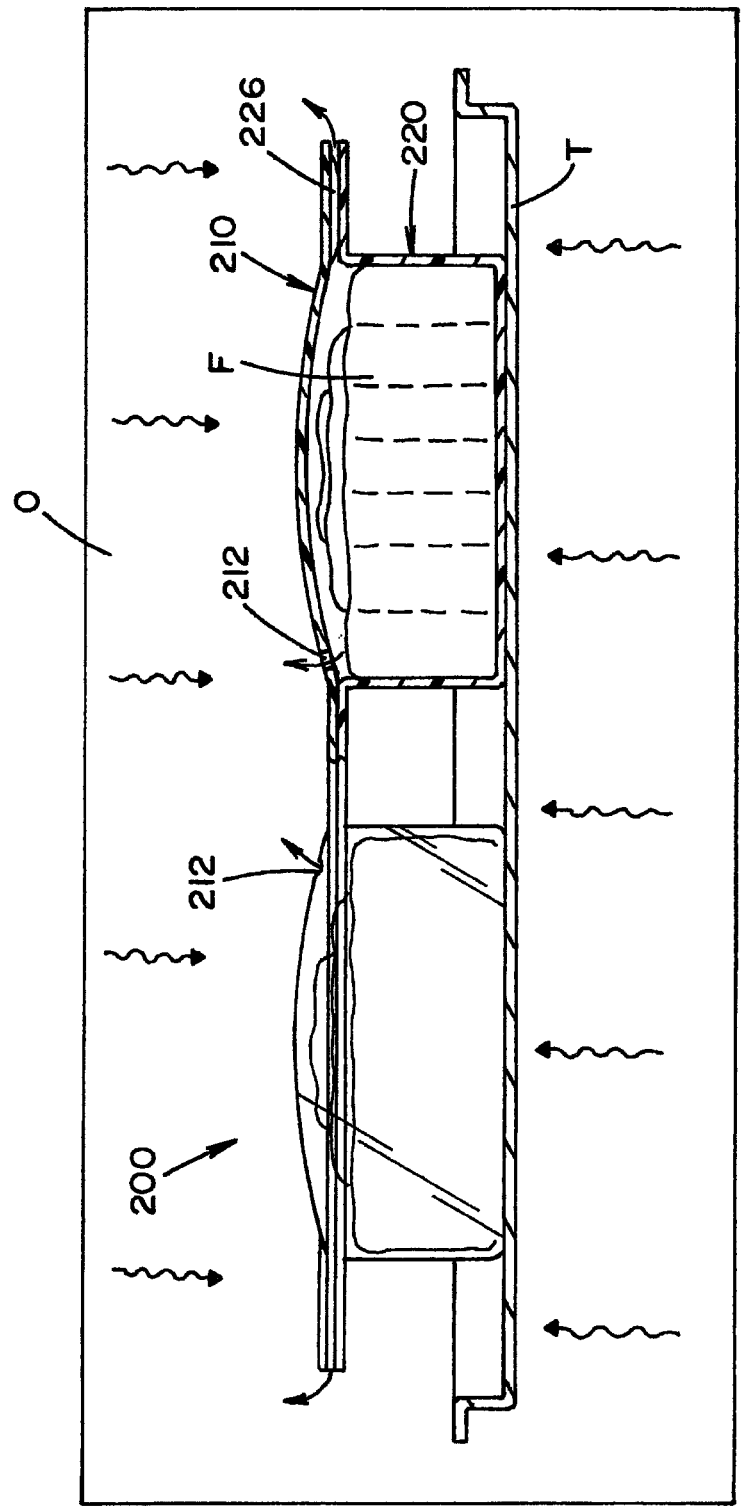
FIG. 17 illustrates the container of FIG. 10 on an oven rack and wherein the container includes food product positioned in the cavities of the base portion and the top portion is secured to the base portion.

Referring now to FIG. 17, the container 200 that includes food product P in the one or more cavities of the base portion 220 is illustrated as being positioned on a baking rack or tray T and being placed in an oven O to bake the food product. The top portion 210 is illustrated as remaining connected to the base portion; however, it can be appreciated that during the baking process, the top portion can be partially or fully removed from the base portion. The base portion of container 220 is designed to substantially retain its shape throughout the baking process; however, this is not required. Generally, the base portion is designed to retain its shape for at least about 70% of the total baking time of the food product, typically at least about 80% total baking time of the food product, and more typically at least about 90% total baking time of the food product.

Figure 18:
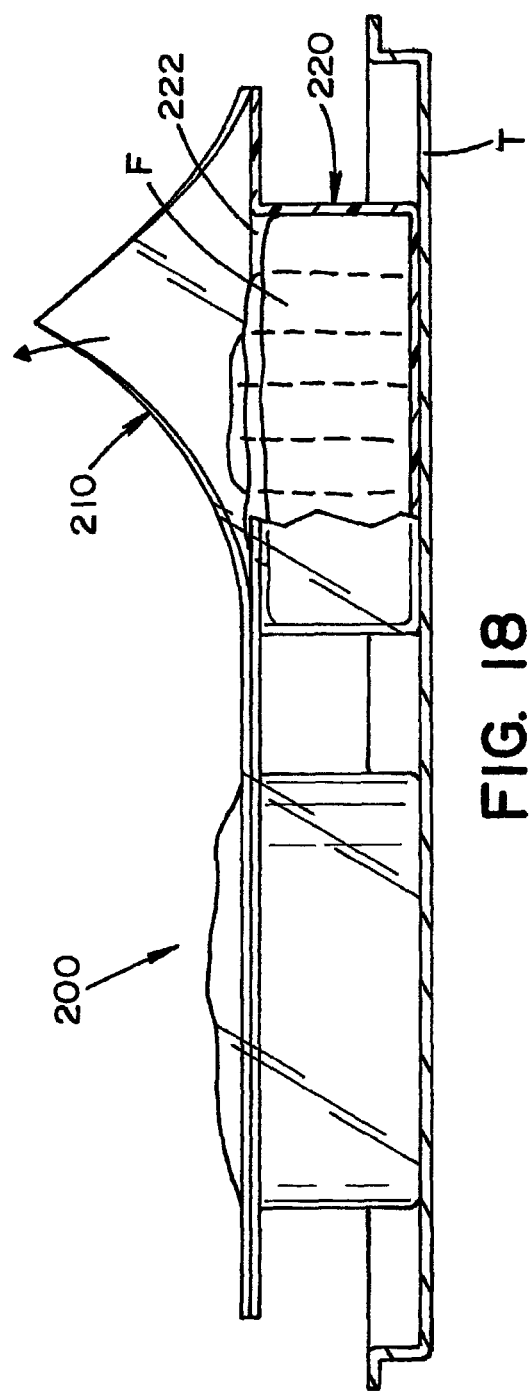
FIG. 18 illustrates the container of FIG. 10 removed from the oven and the top portion is partially removed from the base portion.

Referring now to FIG. 18, if the top portion remains partially or fully secured to the base portion during the baking process, the top portion is removed from the base portion as indicated by the arrow after the completion of the baking process so that the baked product can be removed from the one or more cavities 222 in the base portion. Many different types of food products can be baked in container 200. The top of the food product can optionally have added sugar and/or other types of toppings added prior to, during and/or after the baking process of the food product.

Figure 19:
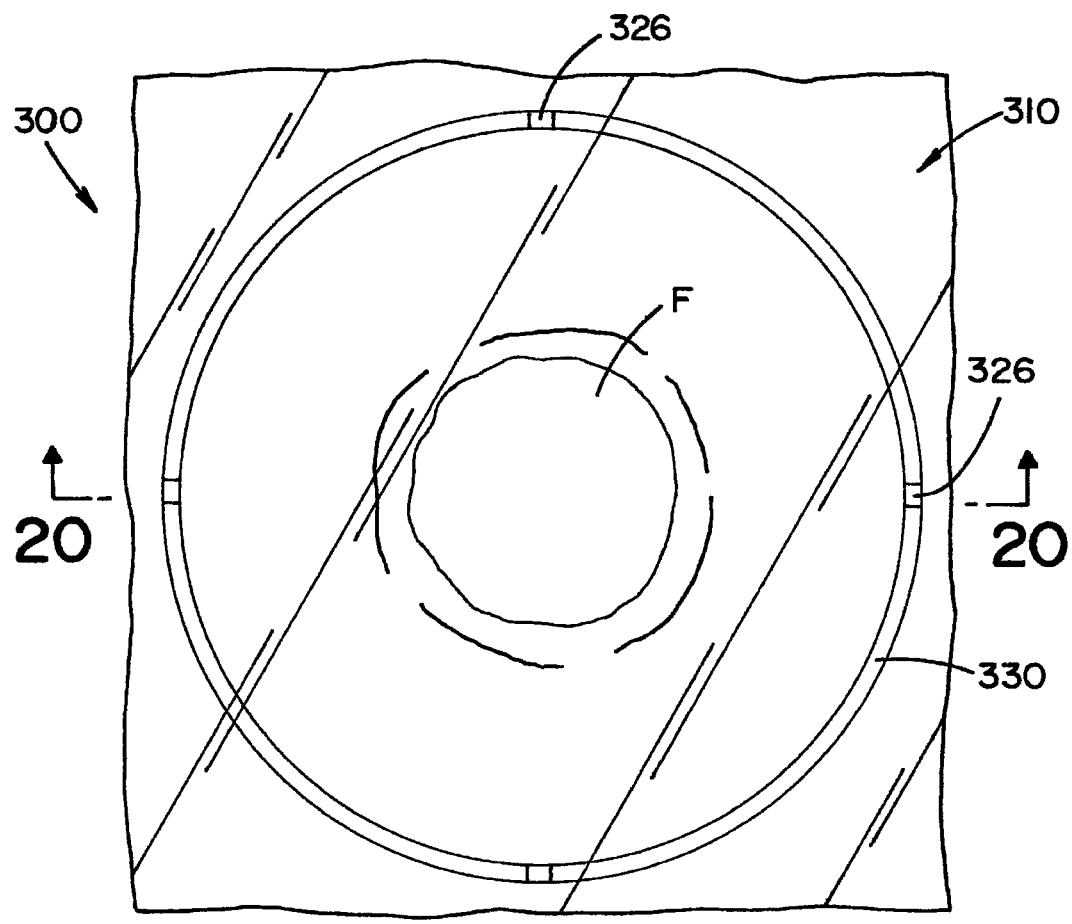
FIG. 19 is a top view of another non-limiting container in accordance with the present invention.
Figure 20:
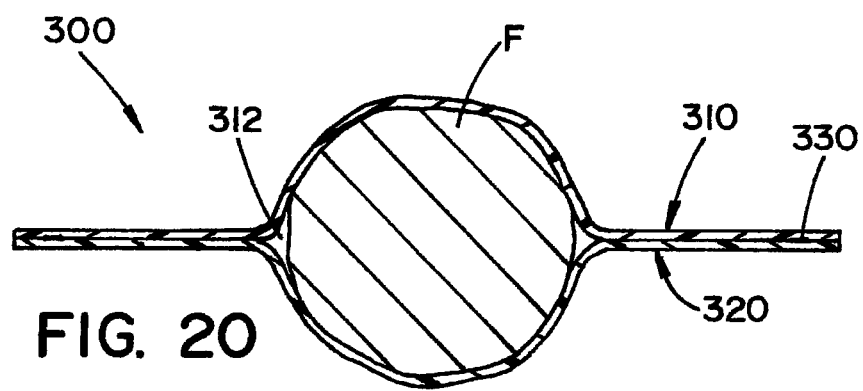
FIG. 20 is a cross-sectional view along lines 20-20 of FIG. 19.

Referring now to FIGS. 19-33, a non-limiting method for forming a self-sheeting pizza dough crust. As can be appreciated, other types of food products can be formed by the container of FIGS. 19-33. Container 300 includes a top portion 310 and a base portion 320. The base portion and top portion are generally formed of a plastic material. The type of plastic material used for the top portion and the base portion can be the same or different. Also, the color, transparency, and/or thickness of the top portion and the base portion can be the same or different. Generally, the base portion is formed of a bakable plastic material; however, this is not required. The top portion may or may not be a bakable plastic material. The top portion and bottom portion are generally formed of a cryogenic plastic material; however, this is not required. The top portion and base portion are illustrated as being a generally flat, planar sheet of material that has a generally uniform thickness; however, this is not required. The top portion and the base portion are formed together to form a single cavity for a food product F. As can be appreciated, the number, size and/or shape of the cavities that are formed by the top and base portions are non-limiting. As illustrated in FIG. 19, the shape of the cavity is generally disc-shaped; however, this is not required.

The type of food product that can be inserted into cavity 312 is non-limiting. Generally, the food product is a dough product, such as a pizza dough, that is used to form a pizza crust; however, this is not required. The dough product when inserted into the cavity may be in a state prior to being proofed, may be partially proofed or may be fully proofed. Generally, the food product is a dough product that has not been fully proofed when inserted into the cavity. The process for inserting the food product into the cavity can be manual, semi-automated or fully automated. During the process of inserting the food product into the cavity, the ambient temperature can be maintained at a cool temperature (e.g., less than 60° F., less than 50° F., less than 40° F., etc.) to limit or prevent the food product from proofing; however, this is not required.

Figure 21:
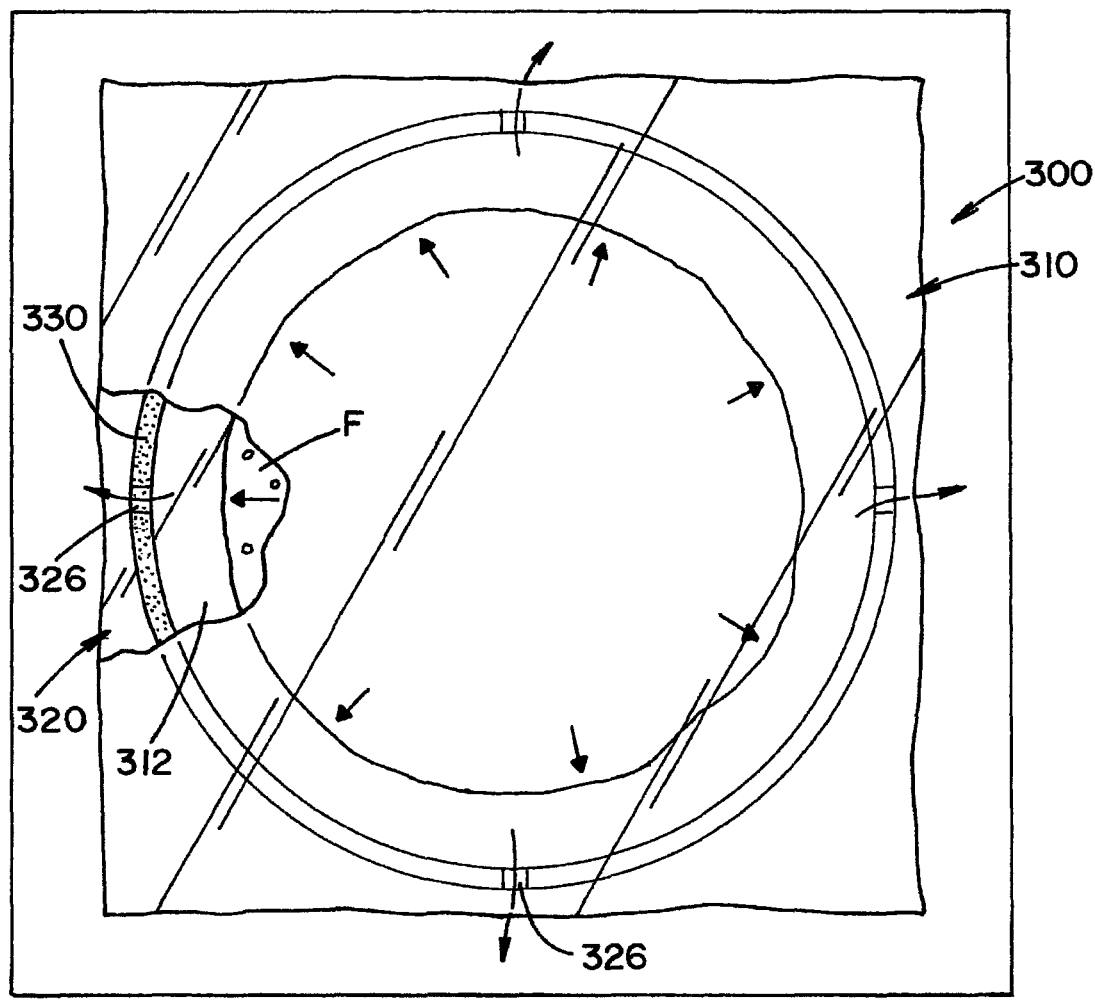
FIG. 21 illustrates the container of FIG. 19 that includes food product positioned in the cavity of the container between the top and base portion of the cavities as the food product expands in the cavity during the proofing of the food product.

After the food product F is inserted into the cavity, the top portion and base portion are fully connected together. The manner in which the top portion is connected to the base portion is non-limiting. In one non-limiting arrangement, an adhesive 330, or pressed or melted seam is used to secure the top portion to the base portion. The top portion can be secured to the base portion such that the top portion fully prevents gas and/or moisture from entering and/or escaping the cavity that includes the food product while the top portion is secured to the base portion; however, this is not required. The top portion can be secured to the base portion such that the top portion allows the controlled release of gas and/or moisture from escaping the cavity that includes the food product while the top portion is secured to the base portion during the proofing and/or baking of the food product as illustrated in FIGS. 19 and 21; however, this is not required. In such an arrangement, 1) the top portion and/or the base portion can include one or more small opening, 2) one or more small openings exist between the top portion and the base portion, and/or 3) one or more small openings are formed between the top portion and the base portion during the proofing and/or baking of the food product once a certain pressure within the cavity is obtained. As illustrated in FIGS. 19 and 21, one or more small openings 326 between the top portion and the base portion of the container to allow the controlled release of gas and/or liquid from the cavity during the proofing and/or baking of the food product. The use of small openings 326 allows for the controlled release of gas and/or liquid from the cavity during the proofing and/or baking of the food product. Generally, the one or more small openings, when used, are preformed in the top portion prior to the top portion being connected to the base portion and/or preformed between the top and/or base portion when the top portion is connected to the base portion; however, this is not required. As can further be appreciated, a breakable bond between the top portion and the base portion can optionally be formed so that after a predefined level of pressure is obtained in a cavity during the proofing and/or baking of a food product, a small space or gap is formed between the top portion and the base portion. The use of a breakable bond can be used as an alternative to or in addition to the use of one or more gaps 326. The breakable bond, when used, can be formed by a variety of ways: 1) use of different adhesives, 2) use of different thickness and/or widths of adhesive in different regions about the perimeter of one or more cavities, 3) the use of release agents, and/or 4) use of heat release agents. The use of one or more openings can be used to control the moisture content of the food product during the proofing and/or baking process, the pH of the food product during the proofing and/or baking process, the size and/or structure of the gas cells in the food product, the rate and/or degree to which the baking product rises during the proofing process, the rate at which the food product bakes, and/or the shape of the product that is formed during the proofing and/or baking process.

Figure 22:
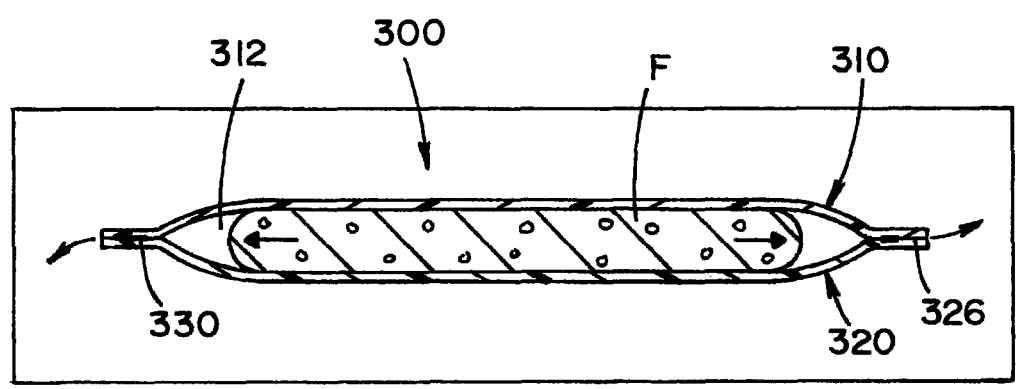
FIG. 22 is a cross-sectional of the container of FIG. 21.

As illustrated in FIG. 21, the food product is illustrated as being proofed in the container and gas and/or liquid formed during the proofing process is allowed to escape from the cavity through gaps 326 as indicated by the arrows. The controlled release of the gas and/or liquid from the cavity limits or presents the ballooning of the cavity during the proofing process so that the dough can form into the desired shape as the dough expands in the cavity during the proofing process. When the food product is a pizza dough product, the cavity can be generally disc-shaped and, as the pizza dough expands during the proofing process in the cavity as indicated by the arrows of FIGS. 21 and 22, the pizza dough partially or fully self-sheets in the cavity of the container during the proofing process as the gas and/or liquid formed during the proofing process is controllably released from the container as indicated by the arrows of FIGS. 21 and 22. During the proofing process, the food product generally expands in the cavity as illustrated by the arrows; however, this is not required. When one or more small openings and/or gaps 326 are used, the size and number of small openings and/or gaps 326 are generally selected such that gas and/or liquid only or substantially only exits the cavity, and little if any gas and/or liquid enters the one or more cavities during proofing and/or baking process. In one non-limiting arrangement, the size and number of small openings and/or gaps 326 are selected such that during at least 40% of the proofing process, there is a pressure in the cavities that is greater than the ambient pressure (e.g., 1 atm, 740-780 torr). Such an arrangement results in gas flowing out of the packaging and not into the packaging during the proofing and/or baking of the pizza crust. In one arrangement, the size and number of openings results in the pressure inside the packaging not reaching equilibrium with the ambient pressure during at least 80%, typically 90%, more typically 95%, and still more typically 100% of the proofing process.

Figure 23:
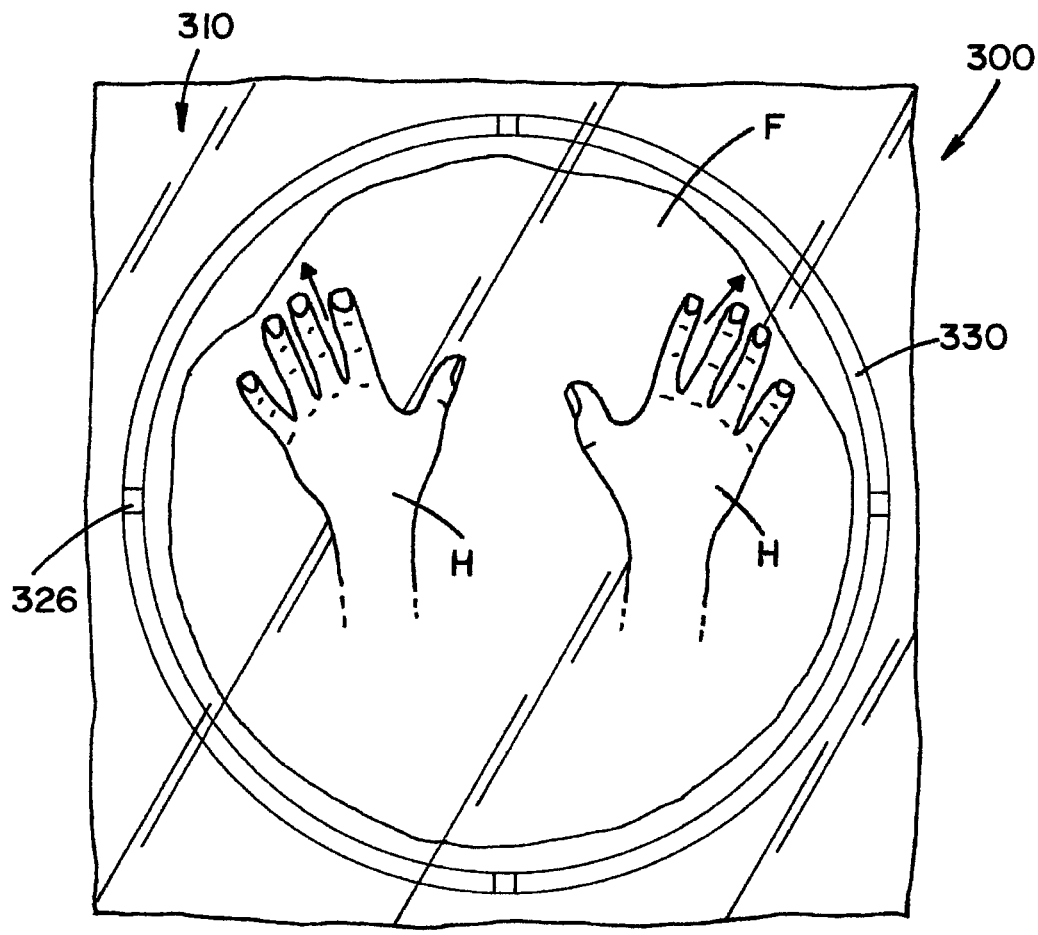
FIG. 23 is a top view of the container after the proofing of the food product in container and the pressing of the proofed food product to further form the food product in the container.
Figure 31:
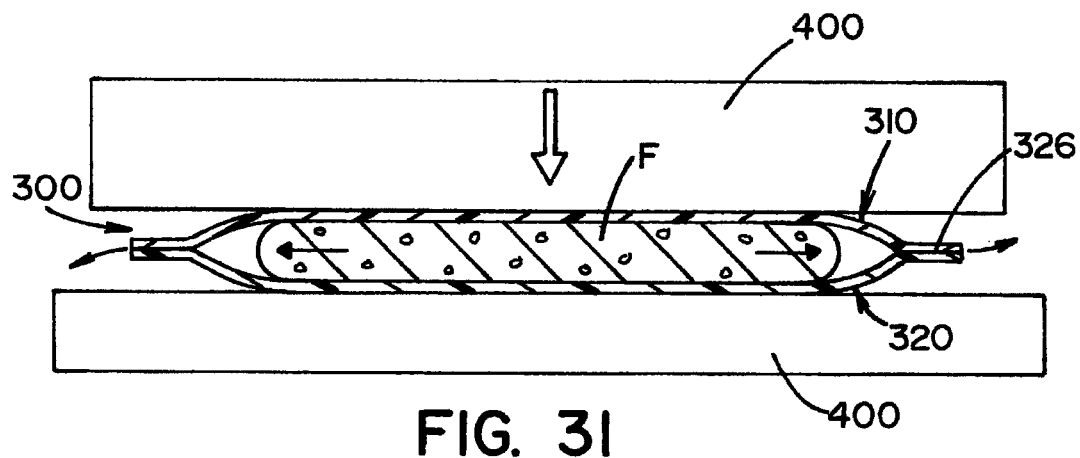
FIGS. 31 and 32 illustrate an alternative method of pressing the proofed food product in the container by the use of a pressing machine; and, FIG. 33 illustrated the removal of the top portion of the container after the pressing process as indicated by the arrow.
Figure 32:
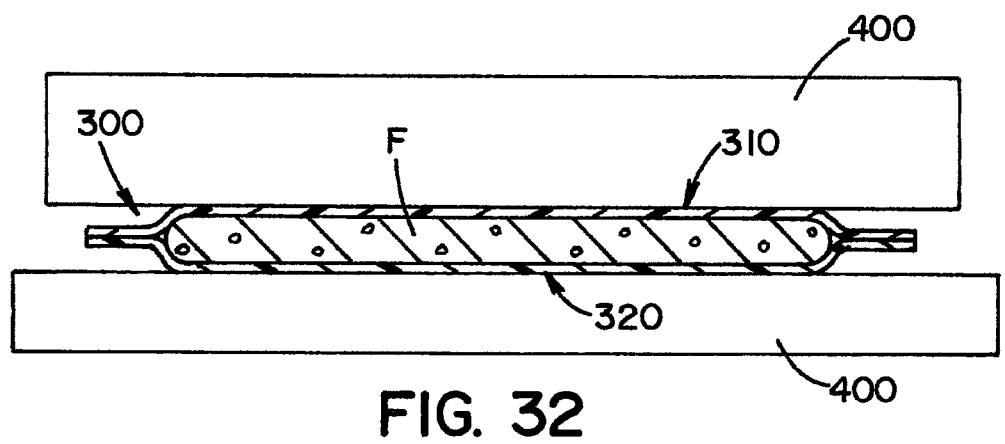

Referring now to FIG. 23, prior to, during and/or after the food product has been proofed in the container, the food product can be manually pressed by hands H so as to facilitate in the sheeting of the food product in the cavity of the container as indicated by the arrows. As can be appreciated, the optional pressing process can be by a machine 400 as indicated by FIGS. 31 and 32. As can be appreciated, the pressing of the food product by machine 400 can be, a manual, an automated or semi-automated process. Any conventional processing machine can be used.

Figure 24:
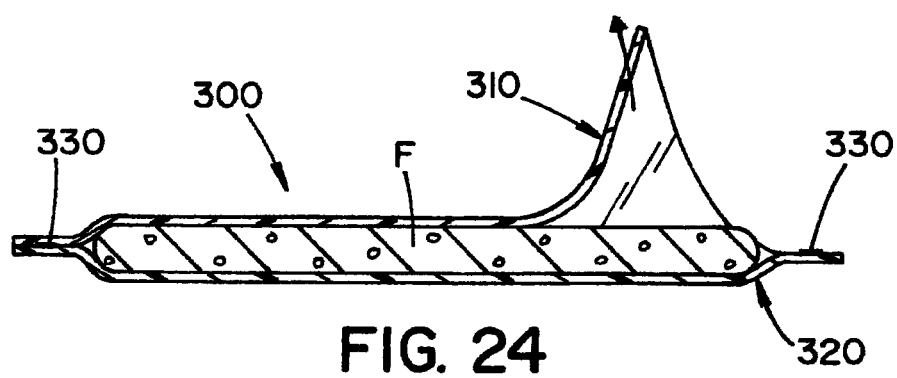
FIG. 24 is a cross-sectional view of the container of FIG. 23 wherein the top portion is removed from the base portion as illustrated by the arrow.
Figure 25:
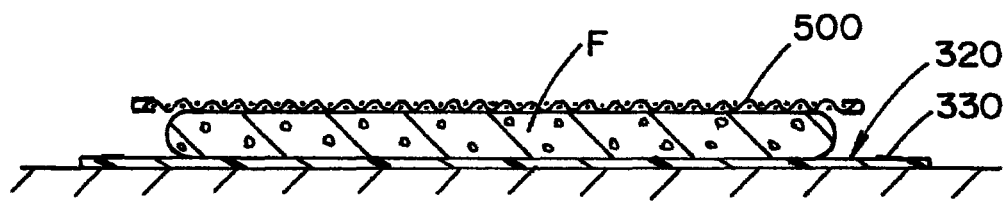
FIG. 25 illustrates a cooking sheet placed on the side of the food product that the formerly covered by the top portion of the container.
Figure 26:
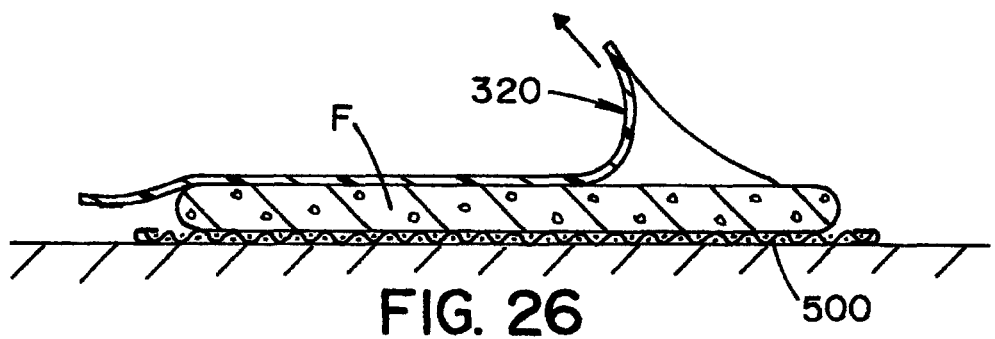
FIG. 26 illustrates the food product being flipped over on the cooking sheet and the base portion of the container being removed from the food product as illustrated by the arrow.
Figure 27:
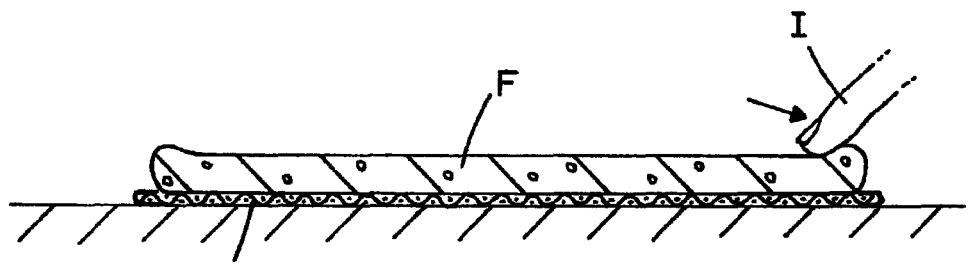
FIG. 27 illustrates the manual forming of a crust rim on the food product.
Figure 28:
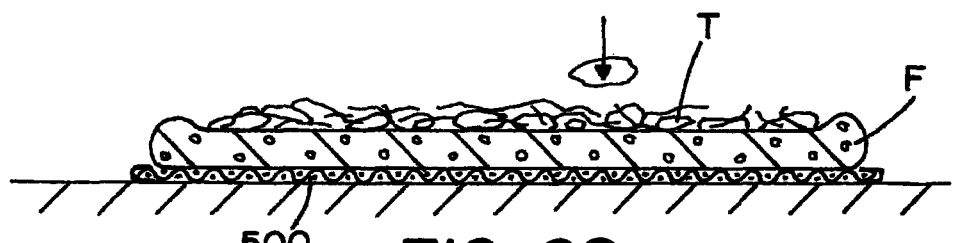
FIG. 28 illustrates the addition of one or more toppings on the upper surface of the food product.
Figure 33:
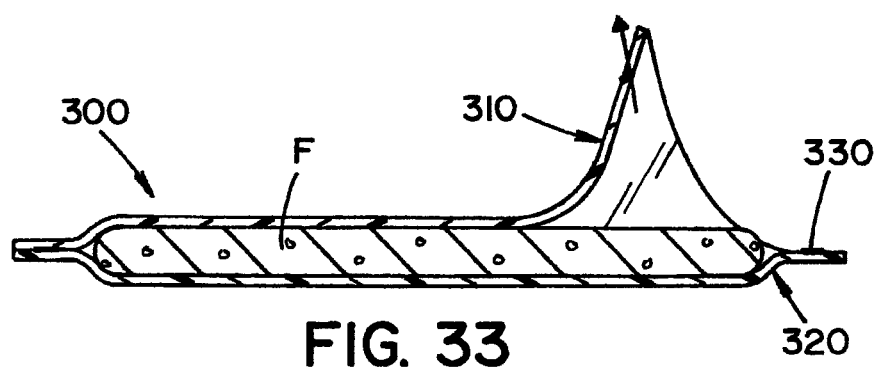

After the proofing and/or pressing process, the dough product can be removed from the container prior to baking the food product. As can be appreciated, the food product can be partially or fully baked in the container; however, this is not required. As illustrated in FIGS. 24 and 33, the top portion of the container is generally removed from the container as indicated by the arrow so that the dough can be further processed and/or removed from the container. Non-limiting examples of further processing steps are illustrated in FIGS. 25-28. FIG. 25 illustrates that after the top portion of the container is removed, a cooking and/or prepping sheet 500 is placed on the exposed food product. As can be appreciated, the food product can be flipped over and placed on a cooking and/or prepping sheet 500. As illustrated in FIG. 26, the food product on the cooking sheet is flipped over and the base portion of the container is removed from the food product as indicated by the arrow. As can be appreciated, if the base portion is a bakable material, the food product can remain in the base portion during the further processing and/or baking of the food product; however, this is not required. As illustrated in FIG. 27, a crust rim is manually formed by fingers I on the sheeted pizza crust; however, this is not required. As can be appreciated, the crust rim can be formed by a machine; however, this is not required. FIG. 28 illustrates that one or more optional toppings T (e.g., sauce, sheet, meat, cheese, vegetables, fruit, oil, seasonings, etc.) can be applied to the sheeted food product.

Figure 30:
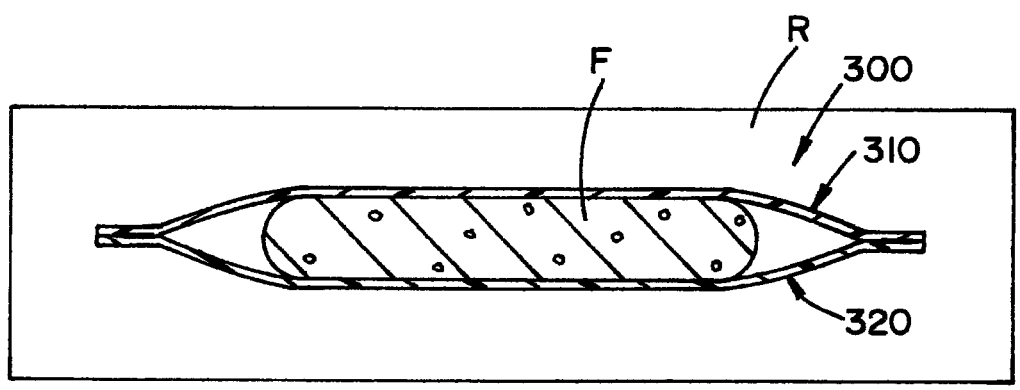
FIG. 30 is a cross-sectional view of the food product in the container of FIG. 19 prior to the food product being fully proofed and the container being placed in a freezer or refrigerator for storage.

As can be appreciated, once the food product is placed in the container, the food product can be optionally placed in a refrigerator or freezer for later processing (e.g., proofing, baking, topping, pressing, etc.). As can be appreciated, the food product can be optionally placed in a refrigerator or freezer after the food product has been partially or fully proofed, pressed, one or more toppings applied to the food product, and/or the food product is partially or fully baked. FIG. 30 illustrates the food product in the container being placed in a refrigerator or freezer R prior to the food product being fully proofed in the container to either cool or freeze the food product in the container. The refrigerator or freezer can include a refrigerated vehicle (e.g., truck, train, ship, etc.), a refrigerator or freezer located a particular facility, etc. The food product in the container that is placed in the refrigerator or freezer can be stored in the refrigerator or freezer for later processing (e.g., proofing and/or baking) or be shipped to a bakery, store, restaurant, etc. The step of refrigerating or freezing the food product in the container is an optional step. The time period that the food product in the container is refrigerated or frozen is non-limiting. As can be appreciated, the food product after it has been partially or fully proofed can be refrigerated or frozen; however, this is not required. As such, the food product in the container can be 1) refrigerated or frozen after the top portion has been secured to the bottom portion, 2) refrigerated or frozen after the food product has been partially or fully proofed, 3) refrigerated or frozen after the top portion has been secured to the bottom portion, then taken out of the refrigerator or freezer to be partially or fully proofed, and then again refrigerated or frozen. As can be appreciated, the number of times that the food product is refrigerated or frozen after the top portion has been secured to the bottom portion is non-limiting. As can be appreciated, the food product in the container can be moved from the freezer to a refrigerator, moved between different freezers, moved between different refrigerators any number of times.

Figure 29:
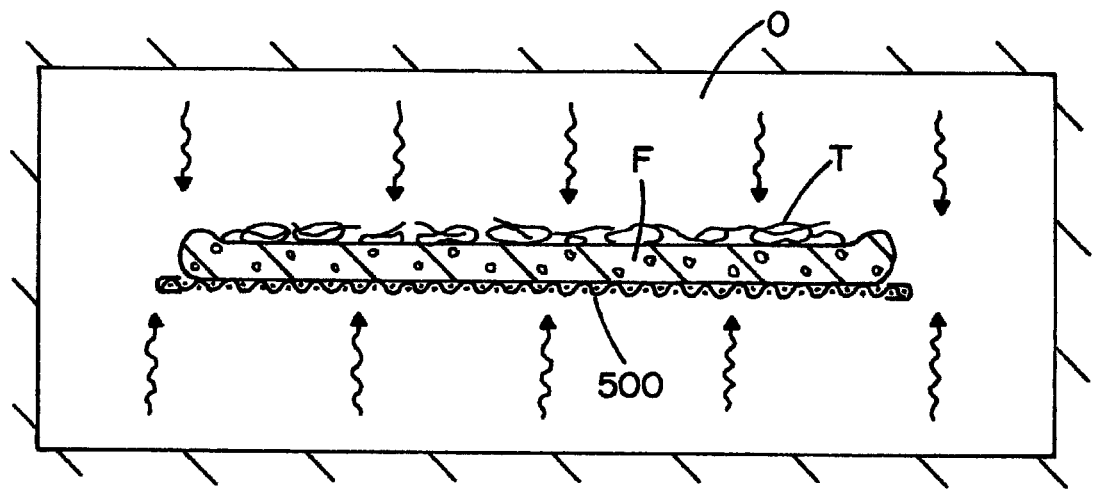
FIG. 29 illustrates the baking of the food product in an oven.

Referring now to FIG. 29, the food product is illustrated as being placed in an oven O for the partial or full baking of the food product F. The food product can be baked directly after removing the food product from a refrigerator or freezer, or after the food product has been proofed and optionally topped. As illustrated in FIG. 29, the top portion and base portion of the container can be removed from the food product prior to the food product being baked; however, it can be appreciated that the base portion and/or top portion of the container can remain on the food product during the partial or full baking of the food product.

The design of the container for the pizza crust as illustrated in FIG. 19 is designed to cause the pizza crust to expand out laterally during the proofing process. The venting feature of the packaging, when used, results in the pizza dough expanding laterally as opposed to the packaging ballooning into a ball if no pressure result arrangement existed. When the packaging is formed of a bakable material as opposed to only a cryogenic material, the bottom portion of the packaging is generally designed to lose all or a portion of its molded form and partially or fully revert back to a flat sheet during baking; however, this is not required. As can be appreciated, the top and/or bottom portion of the packaging for the pizza dough does not require forming.

Although three different embodiments of the container have been described above, it will be appreciated that any of the described features of the containers are interchangeable can be used with any of the embodiments of the invention. As such, the present invention incorporated all of the features and methods described above for each of the container into every container described above.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

We claim:

1. A method for processing a dough product comprising the steps of:
   a. providing a packaging having a base portion and a top portion, said base portion formed of a bakeable material, said base portion including at least one cavity section configured to at least partially receive said dough product, said base portion formed of a plastic material having a composition, a thickness and molded by controlled parameters such that at least a majority of said base portion reverts partially or fully back to its original shape during the baking of said dough product in said base portion when heat is applied to both the base portion and said dough product to cause a majority of said at least one cavity section to be absent from said base portion, and which base portion remains in a post heat base portion shape after completion of the baking of said dough product when heat is no longer applied to said base portion, said top portion partially or fully sealed to said base portion when connected to said base portion;
   b. placing said dough product in said at least one cavity section of said base portion;
   c. connecting said top portion to said base portion after said dough product is placed in said at least one cavity section of said base portion;
   d. at least partially removing said top portion from said base portion prior to fully baking said dough product; and,
   e. baking said dough product, said base portion reverting partially or fully back to its original shape during said baking of said dough product in said base portion such that said at least one cavity section in said base portion is substantially absent from said base portion, said at least one cavity section not reforming in said base position after said base portion is fully cooled wherein said baked dough product is a muffin that substantially has a shape of a muffin top that is substantially or fully absent a traditional shape of a base of a muffin, said molded base portion configured to maintain a pre-baked shape until after a partial or full setting of a top portion of said muffin and then said molded base portion begins to form into a post-baked base portion shape during further baking of said dough product to cause the base of said muffin to reform or merge into said top portion of said muffin prior to said muffin being fully baked.

2. The method as defined in claim 1, including the step of proofing said dough product in said packaging prior to said step of baking.

3. The method as defined in claim 1, wherein said packaging includes a venting arrangement, said venting arrangement enabling gas, moisture, or combinations thereof to escape from said at least one cavity section during said proofing, of said dough product, said venting arrangement including one or more arrangements selected from the group consisting of i) at least one small opening in said top portion, ii) at least one small opening in said base portion, iii) at least one small opening positioned between said top portion and said base portion, iv) at least one formable small opening in said top portion that forms after a predefined pressure is exceed in said at least one cavity section, v) at least one formable small opening in said base portion that forms after a predefined pressure is exceed in said at least one cavity section, and vi) at least one formable small opening positioned between said top portion and said base portion that forms after a predefined pressure is exceed in said at least one cavity section, and including the step of proofing said dough product while said top portion is connected to said base portion, said venting arrangement enabling gas, moisture, or combinations thereof to escape from said at least one cavity section during said proofing of said dough product.

4. The method as defined in claim 3, wherein said venting arrangement includes a plurality of small openings that are positioned between said top portion and said base portion, each of said small openings having a cross-section area of no more than about 0.8 in.$^2$.

5. The method as defined in claim 1, wherein said dough product is refrigerated, frozen, or combinations thereof while said top portion is connected to said base portion and prior to said dough product being fully proofed, baked, or combinations thereof.

6. The method as defined in claim 1, wherein said dough product is refrigerated, frozen, or combinations thereof while said top portion is connected to said base portion and after said dough product has been partially or fully proofed.

7. The method as defined in claim 1, wherein said base portion is formed by a molding process that includes the use a certain pressure and temperature over a certain time period to form said at least one cavity section in said base portion, parameters of said molding process selected to retain a memory of an original shape of said plastic material after completion of said molding process, said plastic material having flat sheet-like shape prior to said molding process.

8. The method as defined in claim 1, wherein a thickness of said top portion is less than a thickness of said base portion.

9. The method as defined in claim 1, wherein said base portion and said top portion are formed of a transparent or semi-transparent material.

10. The method as defined in claim 1, wherein said base portion includes a plurality of cavities, a plurality of said cavities having generally a same shape and size, each of said cavities having an upper lip that encircles an upper opening of each of said cavities, said top portion connected to said upper lip of each of said cavities.

11. The method as defined in claim 10, wherein said base portion includes serrations in said upper lip to enable one or more cavities to be separated from one another, and including the step of separating at least one cavity section from another of said cavities along said serration.

12. A method for processing a dough product comprising the steps of:
a. providing a packaging having a molded base portion and a top portion, said molded base portion formed of a bakeable material, said molded base portion is formed of a cryogenic plastic material, said molded base portion has a thickness that is no more than about 3 mils, said molded base portion including at least one cavity section that at least partially receives said dough product, said molded base portion formed from a flat sheet of plastic material having a composition, a thickness and which said sheet of plastic material is molded by controlled parameters to form said molded base portion having said at least one cavity section, said molded base portion maintaining a memory after being formed and configured such that said molded based portion at least partially reverts back to a shape of said flat sheet of plastic material during said baking of said dough product such that at least a majority of said at least one cavity section is absent from said molded base portion, said molded base portion configured to remain in such post-baked shape after cooling of said molded base portion; said top portion releasably connected to said base portion while said dough product is at least partially positioned in said at least one cavity section to thereby entrap said dough product between said molded base portion and said top portion, said top portion partially or fully sealed to said molded base portion by an adhesive or melted bond, a thickness of said top portion is the same or less than a thickness of said molded base portion;
b. removing said packaging from a refrigerated or frozen environment;
c. at least partially removing said top portion from said molded base portion prior to fully baking said dough product while in said molded base portion;
d. baking said dough product while in said at least one cavity section of said molded base portion by inserting said molded base portion in a heated environment, said molded base portion reverting partially or fully back to said shape of said flat sheet of plastic material during said baking of said dough product to cause said at least one cavity section to be substantially eliminated during said step of baking to form a post baked base portion shape, said post-baked base portion shape having the same as or substantially the same shape of said flat sheet of plastic material, said molded base portion remaining in said post baked base portion shape after completion of said baking of said dough product, said molded base portion configured to maintain a pre-baked shape during at least 5% of a total baking time of said dough product to enable said dough product to at least partially set prior to said molded base portion beginning to form into said post-baked base portion shape during said baking of said dough product;
e. removing said molded base portion and said baked dough product from said heated environment, said molded base portion in said post-baked base portion shape when removed from said heated environment;

f. at least partially cooling said baked dough product while on said molded based portion; and, g. removing said baked dough product from said molded base portion, said molded base portion in said post-baked base portion shape when said baked dough product is removed from said molded base portion wherein said baked dough product is a muffin that substantially has a shape of a muffin top that is substantially or fully absent a traditional shape of a base of a muffin, said molded base portion configured to maintain a pre-baked shape until after a partial or full setting of a top portion of said muffin and then said molded base portion begins to form into a post-baked base portion shape during further baking of said dough product to cause the base of said muffin to reform or merge into said top portion of said muffin prior to said muffin being fully baked.

13. The method as defined in claim 12, including the step of refrigerating, freezing or combinations thereof of said dough product while said top portion is connected to said molded base portion and prior to said dough product being fully proofed, baked, or combinations thereof or after said dough product has been partially or fully proofed.

14. The method as defined in claim 12, wherein said molded base portion is formed by a molding process that includes the use a certain pressure and temperature over a certain time period to form said at least one cavity section in said molded base portion, parameters of said molding process selected to retain a memory of an original shape of said flat sheet of plastic material after completion of said molding process, said plastic material having flat sheet-like shape prior to said molding process.

15. The method as defined in claim 13, wherein said molded base portion is formed by a molding process that includes the use of a certain pressure and temperature over a certain time period to form said at least one cavity section in said molded base portion, parameters of said molding process are selected to retain a memory of an original shape of said flat sheet of plastic material after completion of said molding process, said plastic material having flat sheet-like shape prior to said molding process.

16. The method as defined in claim 12, wherein said molded base portion is a single sheet of plastic material and includes a plurality of cavities, a plurality of said cavities having generally the same shape and size, each of said cavities having an upper lip that encircles an upper opening of each of said cavities, said top portion connected to said upper lip of each of said cavities.

17. The method as defined in claim 15, wherein said molded base portion is a single sheet of plastic material and includes a plurality of cavities, a plurality of said cavities having generally the same shape and size, each of said cavities having an upper lip that encircles an upper opening of each of said cavities, said top portion connected to said upper lip of each of said cavities.

18. The method as defined in claim 16, wherein said molded base portion includes serrations in said upper lip to enable one or more cavities to be separated from one another, and including the step of separating at least one cavity section from another of said cavities along said serration.

19. The method as defined in claim 17, wherein said molded base portion includes serrations in said upper lip to enable one or more cavities to be separated from one another, and including the step of separating at least one cavity section from another of said cavities along said serration.

20. The method as defined in claim 19, wherein said molded base portion and said top portion are formed of a transparent or semi-transparent material.

21. The method as defined in claim 12, wherein said packaging includes a venting arrangement, said venting arrangement enabling gas, moisture, or combinations thereof to escape from said at least one cavity section during said proofing of said dough product, said venting arrangement including one or more arrangements selected from the group consisting of i) at least one small opening in said top portion, ii) at least one small opening in said base portion, iii) at least one small opening positioned between said top portion and said base portion, iv) at least one formable small opening in said top portion that forms after a predefined pressure is exceeded in said at least one cavity section, v) at least one formable small opening in said base portion that forms after a predefined pressure is exceeded in said at least one cavity section, and vi) at least one formable small opening positioned between said top portion and said base portion that forms after a predefined pressure is exceeded in said at least one cavity section, and including the step of proofing said dough product while said top portion is connected to said base portion, said venting arrangement enabling gas, moisture, or combinations thereof to escape from said at least one cavity section during said proofing of said dough product.

22. The method as defined in claim 20, wherein said packaging includes a venting arrangement, said venting arrangement enabling gas, moisture, or combinations thereof to escape from said at least one cavity section during said proofing of said dough product, said venting arrangement including one or more arrangements selected from the group consisting of i) at least one small opening in said top portion, ii) at least one small opening in said base portion, iii) at least one small opening positioned between said top portion and said base portion, iv) at least one formable small opening in said top portion that forms after a predefined pressure is exceeded in said at least one cavity section, v) at least one formable small opening in said base portion that forms after a predefined pressure is exceeded in said at least one cavity section, and vi) at least one formable small opening positioned between said top portion and said base portion that forms after a predefined pressure is exceeded in said at least one cavity section, and including the step of proofing said dough product while said top portion is connected to said base portion, said venting arrangement enabling gas, moisture, or combinations thereof to escape from said at least one cavity section during said proofing of said dough product.

23. The method as defined in claim 22, wherein said venting arrangement includes a plurality of small openings that are positioned between said top portion and said molded base portion, each of said small openings having a cross-section area of no more than about 0.8 in.$^2$.

24. The method as defined in claim 1, further comprising cooling said dough product, said base portion remaining in said post-heated base portion shape during said cooling of said dough product.

25. The method as defined in claim 12, wherein said plastic material is a polyester material.

26. The method as defined in claim 19, wherein said plastic material is a polyester material.

27. The method as defined in claim 1, wherein, said molded base portion is configured to maintain a pre-baked shape during at least 5% of a total baking time of said dough product to enable said dough product to at least partially set prior to said molded base portion beginning to partially or fully back to its original shape during said baking of said dough product.

* * * * *